United States Patent
Vyas et al.

(10) Patent No.: US 11,722,796 B2
(45) Date of Patent: Aug. 8, 2023

(54) SELF-REGULARIZING INVERSE FILTER FOR IMAGE DEBLURRING

(71) Applicant: Samsung Electronics Company, Ltd., Gyeonggi-Do (KR)

(72) Inventors: Kushal Kardam Vyas, Santa Clara, CA (US); Changgeng Liu, San Jose, CA (US); Ernest Rehmatulla Post, San Francisco, CA (US)

(73) Assignee: Samsung Electronics Co., Ltd., Suwon Si (KR)

( * ) Notice: Subject to any disclaimer, the term of this patent is extended or adjusted under 35 U.S.C. 154(b) by 0 days.

(21) Appl. No.: 17/380,995

(22) Filed: Jul. 20, 2021

(65) Prior Publication Data
US 2022/0277426 A1  Sep. 1, 2022

Related U.S. Application Data

(60) Provisional application No. 63/154,122, filed on Feb. 26, 2021.

(51) Int. Cl.
*H04N 5/357* (2011.01)
*H04N 5/225* (2006.01)
(Continued)

(52) U.S. Cl.
CPC .......... *H04N 25/615* (2023.01); *H04N 23/57* (2023.01); *H04N 23/682* (2023.01); *H04N 23/80* (2023.01)

(58) Field of Classification Search
CPC ......... G06T 5/003; G06T 5/20; H04N 5/2257; H04N 5/23229; H04N 5/23264; H04N 5/35721
See application file for complete search history.

(56) References Cited

U.S. PATENT DOCUMENTS

| 3,971,065 A | 7/1976 | Bayer |
| 6,454,414 B1 | 9/2002 | Ting |

(Continued)

FOREIGN PATENT DOCUMENTS

| CN | 101414094 A | 4/2009 |
| CN | 112202991 A | 1/2021 |

(Continued)

OTHER PUBLICATIONS

Yang, Hang, Zhongbo Zhang, and Yujing Guan. "An adaptive parameter estimation for guided filter based image deconvolution." *Signal Processing* 138 (2017): 16-26, Mar. 7, 2017.

(Continued)

*Primary Examiner* — Christopher K Peterson

(57) ABSTRACT

A method includes capturing, by a camera disposed behind a display panel of an electronic device, an original image through a semi-transparent pixel region of the display panel. The original image is associated with one or more predetermined point spread functions (PSFs) and includes one or more blurring artifacts. The method further includes estimating an optimal regularization parameter for the original image based on the one or more predetermined PSFs and the one or more blurring artifacts, applying a self-regularizing inverse filter, such as a fast self-regularizing inverse filter, to the original image based on the estimated regularization parameter, and generating a deblurred image based on the self-regularizing inverse filter. Generating the deblurred image includes reconstructing the original image utilizing the self-regularizing inverse filter to remove the one or more blurring artifacts.

20 Claims, 28 Drawing Sheets

(51) Int. Cl.
  *H04N 5/232* (2006.01)
  *H04N 25/615* (2023.01)
  *H04N 23/57* (2023.01)
  *H04N 23/80* (2023.01)
  *H04N 23/68* (2023.01)

(56) References Cited

U.S. PATENT DOCUMENTS

| | | |
|---|---|---|
| 7,053,613 B2 | 5/2006 | Lin |
| 8,041,142 B2 | 10/2011 | Schafer |
| 8,433,152 B2 | 4/2013 | Watanabe et al. |
| 8,582,911 B2 | 11/2013 | Kim |
| 8,587,703 B2 | 11/2013 | Lelescu |
| 9,220,481 B2 | 12/2015 | Park |
| 9,338,354 B2 | 5/2016 | Hong |
| 9,582,862 B2 | 2/2017 | Zhang |
| 9,654,707 B2 | 5/2017 | Oniki |
| 9,911,208 B2 | 3/2018 | Zhou |
| 9,916,656 B2 | 3/2018 | Choi |
| 9,947,901 B2 | 4/2018 | Shedletsky |
| 9,948,849 B2 | 4/2018 | Kim |
| 10,032,254 B2 | 7/2018 | Harmeling |
| 10,062,153 B2 | 8/2018 | Oniki |
| 10,083,335 B2 | 9/2018 | Zhang |
| 10,178,381 B2 | 1/2019 | Hall |
| 10,191,577 B2 | 1/2019 | Choi |
| 10,217,190 B2 | 2/2019 | Liu |
| 10,416,087 B2 | 9/2019 | Zhang |
| 10,595,724 B2 | 3/2020 | Lai |
| 10,642,059 B2 | 5/2020 | Soskind |
| 10,656,437 B2 | 5/2020 | Limon |
| 11,003,088 B2 | 5/2021 | Sorg |
| 11,038,143 B2 | 6/2021 | Moon |
| 11,073,712 B2 | 7/2021 | Yeke Yazdandoost |
| 11,272,106 B1 | 3/2022 | Lee |
| 2003/0002746 A1 | 1/2003 | Kusaka |
| 2006/0103951 A1 | 5/2006 | Bell |
| 2006/0256226 A1 | 11/2006 | Alon |
| 2008/0013850 A1 | 1/2008 | Sakurai |
| 2008/0068660 A1* | 3/2008 | Loce .................. H04N 1/40075 358/1.9 |
| 2008/0165261 A1 | 7/2008 | Kamo |
| 2008/0166115 A1 | 7/2008 | Sachs |
| 2008/0218597 A1 | 9/2008 | Cho |
| 2008/0292135 A1 | 11/2008 | Schafer |
| 2009/0147111 A1 | 6/2009 | Litvinov |
| 2009/0263043 A1 | 10/2009 | Cristobal |
| 2010/0073518 A1 | 3/2010 | Yeh |
| 2010/0188528 A1 | 7/2010 | Iwata |
| 2011/0019056 A1 | 1/2011 | Hirsch |
| 2011/0075257 A1 | 3/2011 | Hua |
| 2011/0221888 A1 | 9/2011 | Choi |
| 2011/0285680 A1 | 11/2011 | Nakamura |
| 2012/0057072 A1 | 3/2012 | Yamashita |
| 2012/0162490 A1 | 6/2012 | Chung |
| 2013/0010077 A1 | 1/2013 | Nguyen |
| 2013/0147778 A1 | 6/2013 | Ninan |
| 2013/0182062 A1 | 7/2013 | Son |
| 2013/0308007 A1 | 11/2013 | Tanaka |
| 2013/0321686 A1 | 12/2013 | Tan |
| 2013/0336597 A1 | 12/2013 | Maeda |
| 2014/0044314 A1 | 2/2014 | Sezer |
| 2015/0049165 A1 | 2/2015 | Choi |
| 2015/0207962 A1 | 7/2015 | Sugimoto |
| 2016/0180510 A1 | 6/2016 | Grau |
| 2016/0248975 A1 | 8/2016 | Choi |
| 2016/0277658 A1 | 9/2016 | Kim |
| 2016/0371821 A1 | 12/2016 | Hayashi |
| 2017/0076430 A1 | 3/2017 | Xu |
| 2017/0104897 A1 | 4/2017 | Kang |
| 2017/0212613 A1 | 7/2017 | Hwang |
| 2017/0316552 A1 | 11/2017 | Hanocka |
| 2018/0038768 A1 | 2/2018 | Hofmann |
| 2018/0116500 A1 | 5/2018 | Escalier |
| 2018/0129061 A1 | 5/2018 | Shinohara |
| 2018/0198980 A1 | 7/2018 | Takagi |
| 2018/0211420 A1 | 7/2018 | Yoo |
| 2019/0212544 A1 | 7/2019 | Heber |
| 2019/0213717 A1 | 7/2019 | Oniki |
| 2019/0327417 A1 | 10/2019 | Moriuchi |
| 2019/0355101 A1 | 11/2019 | Chen |
| 2020/0166807 A1 | 5/2020 | Sasaki |
| 2020/0169725 A1 | 5/2020 | Hua |
| 2020/0209604 A1 | 7/2020 | Chen |
| 2020/0321561 A1 | 10/2020 | Park |
| 2020/0389575 A1 | 12/2020 | Gove |
| 2020/0394964 A1 | 12/2020 | Hyun |
| 2021/0029336 A1 | 1/2021 | Liu |
| 2021/0152735 A1 | 5/2021 | Zhou |
| 2021/0193756 A1 | 6/2021 | Oh |
| 2021/0199952 A1* | 7/2021 | Cho .................. G02B 5/208 |
| 2021/0210533 A1 | 7/2021 | Cho |
| 2021/0233976 A1 | 7/2021 | Lee |
| 2022/0067889 A1 | 3/2022 | Kang |
| 2022/0138924 A1 | 5/2022 | Kwon |
| 2022/0261966 A1 | 8/2022 | Liu |
| 2022/0292637 A1 | 9/2022 | Huang |

FOREIGN PATENT DOCUMENTS

| | | |
|---|---|---|
| CN | 108335268 B | 9/2021 |
| CN | 114331886 A | 4/2022 |
| CN | 110675347 B | 5/2022 |
| JP | 2008-070566 A | 3/2008 |
| KR | 101894391 | 9/2018 |
| KR | 10-2022-0014764 A | 2/2022 |
| WO | WO 2010081229 A1 | 7/2010 |
| WO | WO 2016-154392 A1 | 9/2016 |
| WO | WO 2017117152 A1 | 7/2017 |
| WO | WO 2021/122471 A1 | 6/2021 |
| WO | WO 2022-005157 A1 | 1/2022 |

OTHER PUBLICATIONS

Youmaran, R., and A. Adler. "Combining regularization frameworks for image deblurring: optimization of combined hyper-parameters." In *Canadian Conference on Electrical and Computer Engineering 2004* (IEEE Cat. No. 04CH37513), vol. 2, pp. 723-726. IEEE, May 2, 2004.

PCT Search Report and written decision in PCT/KR2022/001024, dated May 10, 2022.

PCT Search Report and Written Decision in PCT/KR2022/001920, dated May 13, 2022.

Non-Final Office Action in U.S. Appl. No. 17/176,535, dated Aug. 16, 2022.

Levin, A. et al., "Image and Depth from a Conventional Camera with a Coded Aperture," ACM Transactions on Graphics, vol. 26, No. 3, Article 70, Publication date Jul. 2007, DOI 10.1145/1239451.123952, http://doi.acm.org/10.1145/1239451.1239521, 9 pgs.

Hong, J., et al., "Three-dimensional display technologies of recent interest: principles, status, and issues [Invited]," (Doc. ID 152226), Applied Optics, vol. 50, No. 34, , Dec. 1, 2011, https://www.researchgate.net/publication/51919272, DOI: 10.1364/AO.50.000H87, 0003-6935/11/340H87, © 2011 Optical Societyof America, pp. H87-H115 (30 pages).

Ren, Ng, "Digital light field photography," PhD dissertation, Stanford University, Jul. 2006, 203 pgs.

Qin, Zong, et al., "See-Through Image Blurring of Transparent Organic Light-Emitting Diodes Display: Calculation Method Based on Diffiaction and Analysis of Pixel Structures," Journal of Display Technology, vol. 12, No. 11, Nov. 2016, Digital Object Identifier 10.1109/JDT.2016.2594815, 1551-319X © 2016 IEEE, pp. 1242-1249 (9 pgs).

Richardson, William Hadley, "Bayesian-Based Iterative Method of Image Restoration," Journal of Optical Society of America, vol. 62, No. 1, Jan. 1972, pp. 55-59 (5 pgs).

Lucy, L. B., "An Iterative Technique for the Rectification of Observed Distributions," The Astronomical Journal, vol. 79, No. 6,

(56) References Cited

OTHER PUBLICATIONS

Jun. 1974, © American Astronomical Society, provided by the NASA Astrophysics Data System, pp. 745-754 (10 pgs).

Heide, Felix, et al., "ProxImaL: Efficient Image Optimization Using Proximal Algorithms," SIGGRAPH 16 Technical paper, Jul. 24-28, 2016, Anaheim, CA. SIGGRAPH '16 Technical Paper, Jul. 24-28, 2016, Anaheim, CA, ISBN: 978-1-4503-4279-7/16/07 DOI: http://dx.doi.org/10.1145/2897824.2925875, 15 pages.

Sitzmann, Vincent., et al., "End-to-End Optimization of Optics and Image Processing for Achromatic Extended Depth of Field and Super-Resolution Imaging," © 2018 ACM 0730-0301/2018/8-ART114, https://doi.org/10.1145/3197517.3201333, ACM Transactions on Graphics vol. 37, No. 4, Article 114, Publication Aug. 2018, pp. 114:1-114:13 (13 pgs.).

Lai, Richard, "Oppo's under-screen camera is real and taking photos in Shanghai," https://www.engadget.com/2019-06-26-oppo-under-screen-camera-mwc-shanghai.html, Jun. 26, 2019, 8 pgs.

International Search Report and Written Opinion for International App. No. PCT/KR2020/009807, dated Oct. 26, 2020.

European Search Report in EP 20846484.2, dated Mar. 14, 2022.

Non-Final Office Action in U.S. Appl. No. 16/935,946, dated Apr. 5, 2022.

Notice of Allowance in U.S. Appl. No. 16/935,946, dated Jul. 6, 2022.

Final Office Action in U.S. Appl. No. 17/176,535, dated Nov. 7, 2022.

Image Restoration for Under-Display Camera, Yuqian Zhou et al., CVPR 2021, accessed on Oct. 25, 2022 at https://openaccess.thecvf.com/CVPR2021?day=all.

Anqi Yang et al., 'Designing Display Pixel Layouts for Under-Panel Cameras', IEEE Transactions on Pattern Analysis and Machine Intelligence, vol. 43, No. 7, pp. 2245-2256, Apr. 27, 2021.

PCT Search Report and Written Decision in PCT/KR2022/011598, dated Nov. 16, 2022.

Notice of Allowance in U.S. Appl. No. 17/176,535, dated Mar. 8, 2023.

PCT Search Report and Written Opinion in PCT/KR2022/015641, dated Jan. 26, 2023.

\* cited by examiner

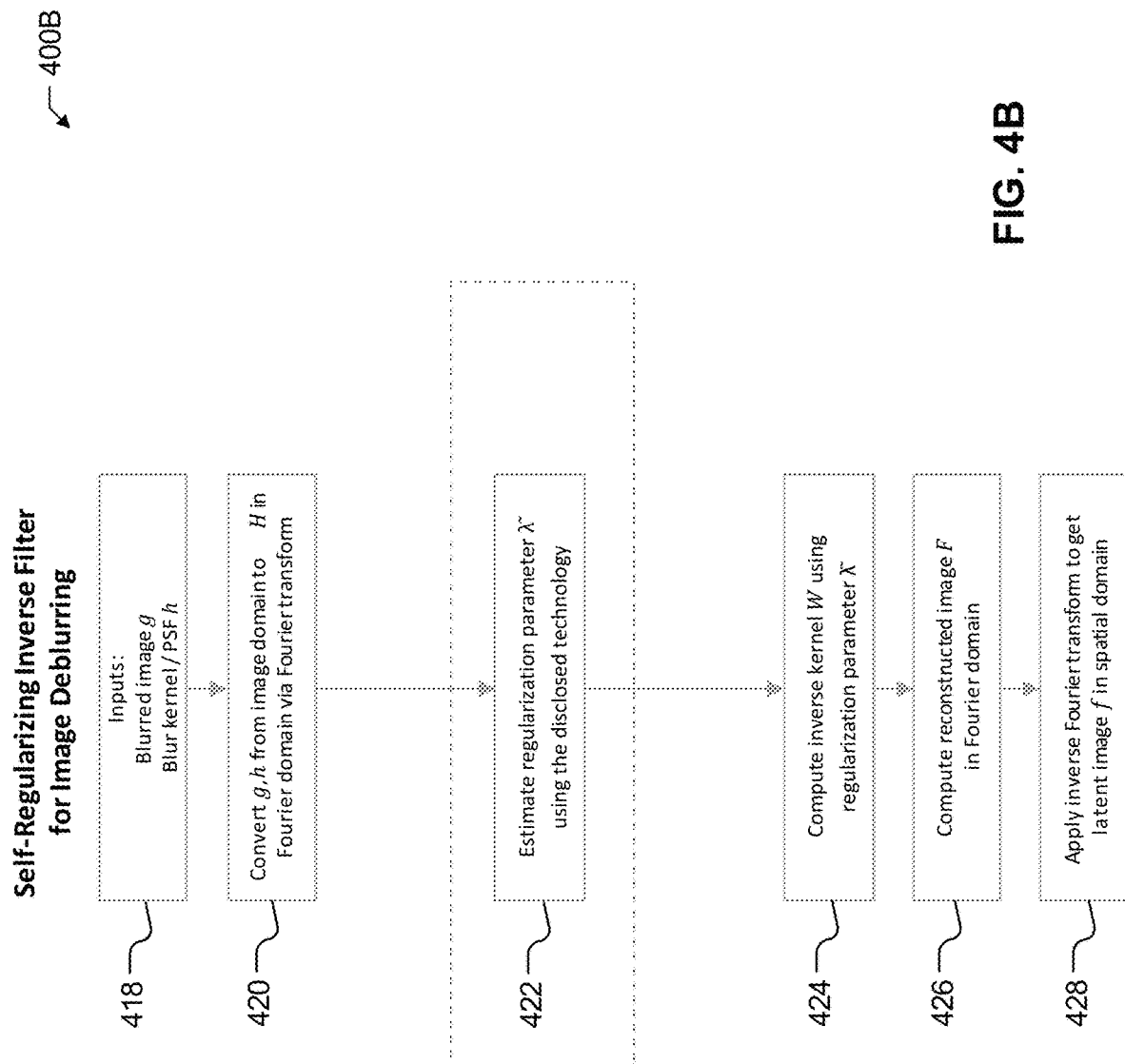

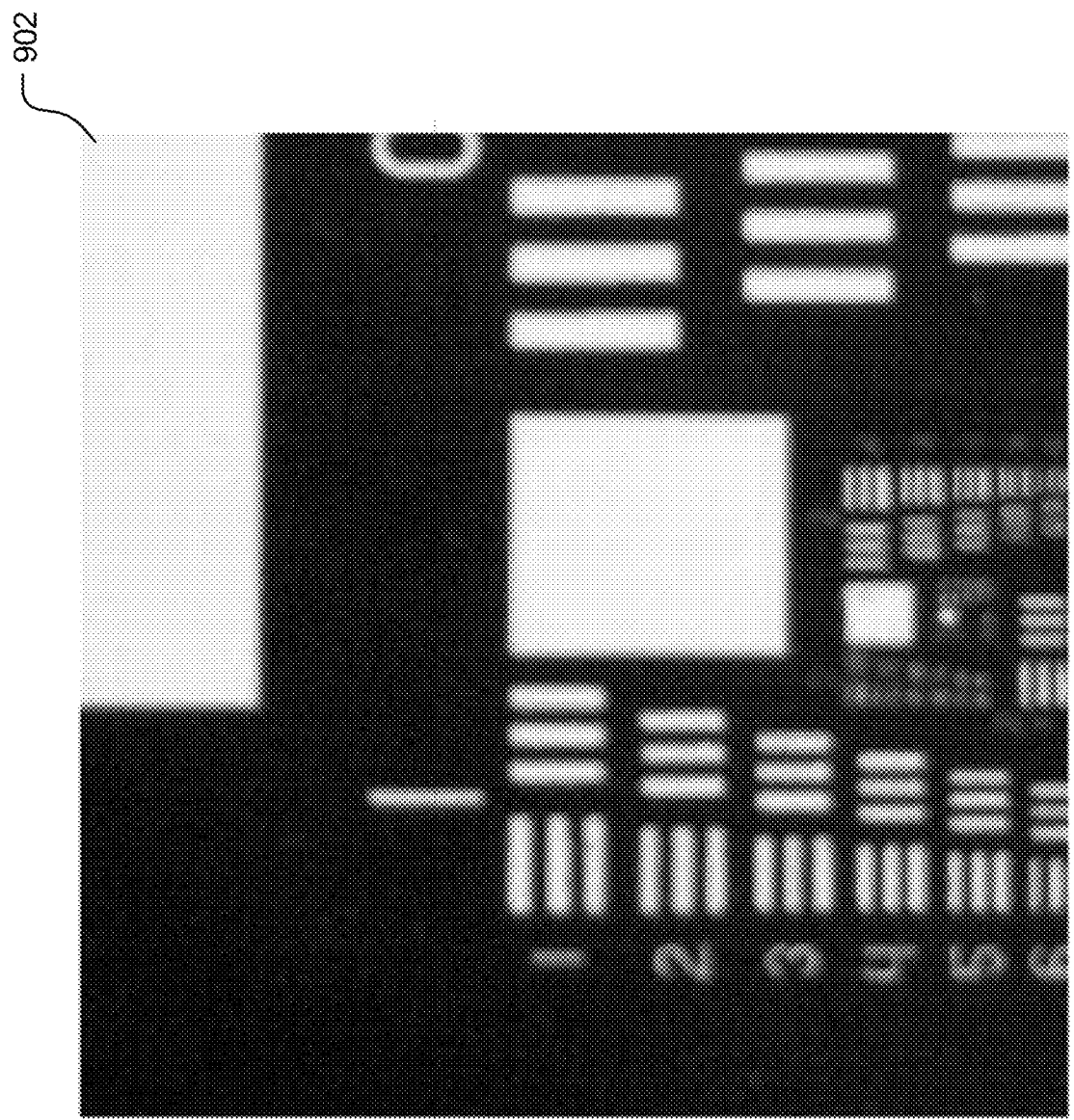

Timing Analysis and Speed-Up

| | Timing for a 512 x 512 Normalized Image (approx. per channel) | Timing for a 2016 x 1512 Un-normalized RAW Image (approx. per channel) |
|---|---|---|
| Image recovered using Iterative Minimization | 0.0685 seconds | 4.7209 seconds |
| Image recovered using Disclosed Technology | 0.0127 seconds | 1.3854 seconds |

512 x 512 Image: there is a speedup of ~5x per channel 2016 x 1512 Image: there is a speedup of ~3.4x per channel

FIG. 11

SELF-REGULARIZING INVERSE FILTER FOR IMAGE DEBLURRING

PRIORITY

This application claims the benefit under 35 U.S.C. § 119(e) of U.S. Provisional Patent Application No. 63/154,122, filed 26 Feb. 2021, which is incorporated herein by reference.

TECHNICAL FIELD

This disclosure relates generally to electronic displays, and, more particularly, to a self-regularizing inverse filter for deblurring images captured by a camera behind the electronic displays.

BACKGROUND

Electronic displays, such as active matrix liquid crystal displays (AMLCDs), active matrix organic light emitting displays (AMOLEDs), and micro-LED displays are typically the types of the displays that are deployed for use in personal electronic devices (e.g., mobile phones, tablet computers, smartwatches, and so forth). Such personal electronic devices may generally include a front-facing camera, which may be disposed adjacent to the display, and may be utilized most often by users to capture self-portraits (e.g., "selfies"). However, as front-facing camera systems grow in complexity (e.g., depth cameras), more and more of the area designated for the display of the electronic device may be traded off to expand the area designated for the camera system. This may lead to a reduction in resolution and viewing area of the display. One technique to overcome the reduction in resolution and viewing area of the display may be to dispose the front-facing camera system completely behind or underneath the display panel. However, disposing the front-facing camera system behind the display panel may often degrade images captured by the front-facing camera. It may be thus useful to provide improved techniques to reconstruct images captured by front-facing camera systems disposed behind a display panel.

BRIEF DESCRIPTION OF THE DRAWINGS

FIG. 4B illustrates a flow diagram of an improved method for generating a deblurred image based on a self-regularizing inverse filter to remove one or more blurring artifacts in real-time or near real-time.

FIGS. 9A, 9B, 9C, 9D, 9E, 9F, 9G, 9H, 9I, 9J, and 9K illustrate experimental examples associated with generating a deblurred image using a conventional regularized inverse filter and a deblurred image based on a self-regularizing inverse filter of the disclosed technology to remove one or more blurring artifacts in real-time or near real-time.

FIG. 10 and FIG. 11 illustrate additional experimental examples associated with generating a deblurred image using a conventional regularized inverse filter and a deblurred image based on a self-regularizing inverse filter of the disclosed technology to remove one or more blurring artifacts in real-time or near real-time.

DESCRIPTION OF EXAMPLE EMBODIMENTS

Figure 1A:
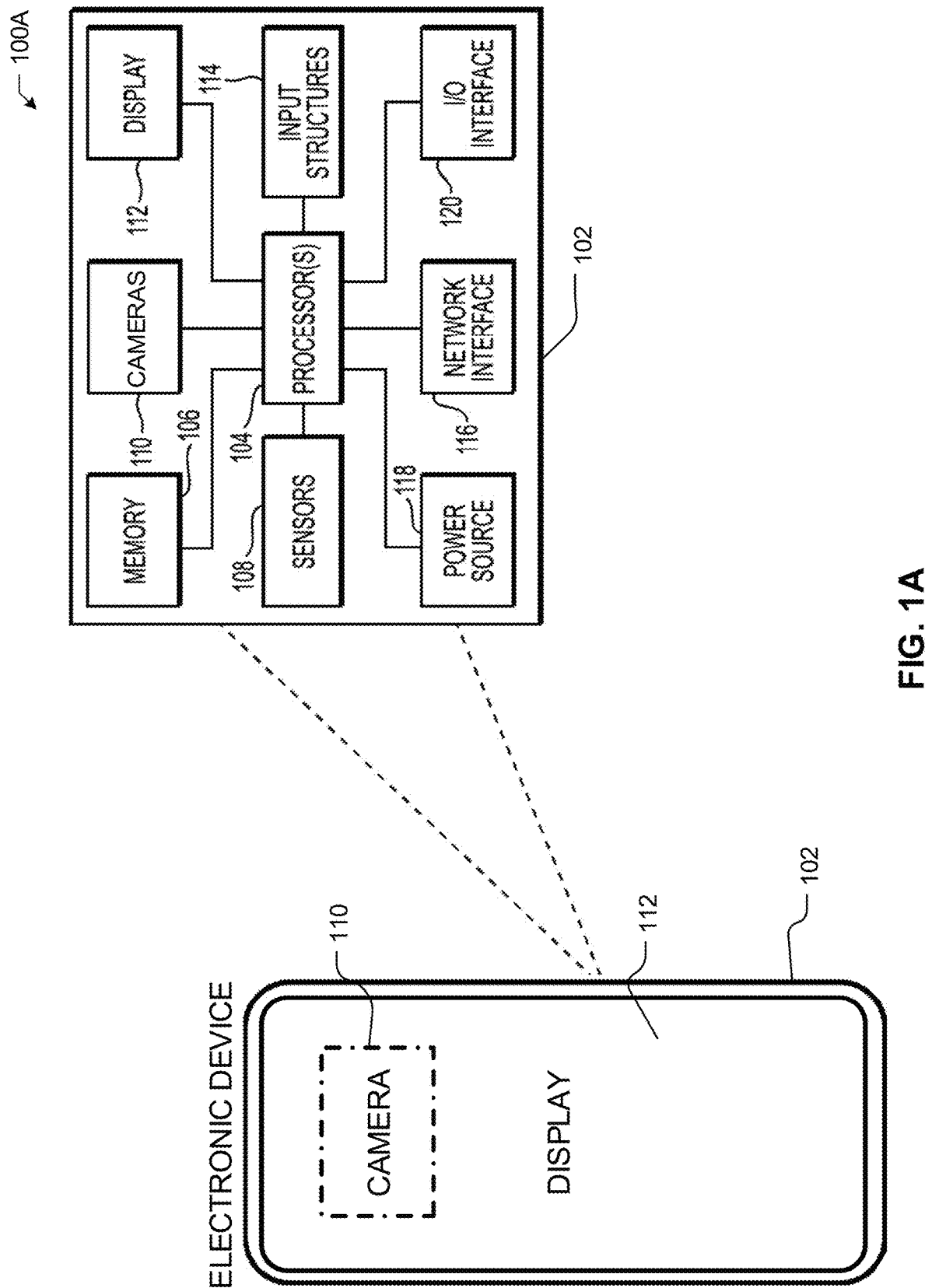
FIG. 1A illustrates an example diagram of an electronic device.

The present embodiments are directed toward techniques for generating a deblurred image based on a self-regularizing inverse filter (e.g., a fast self-regularizing inverse filter) to remove one or more blurring artifacts in real-time or near real-time. In particular embodiments, an electronic device may capture, by a camera disposed behind a display panel of the electronic device, an original image through a semi-transparent pixel region of the display panel. For example, in particular embodiments, the original image may be associated with one or more predetermined point spread functions (PSFs) and includes one or more blurring artifacts. In particular embodiments, the one or more predetermined PSFs may be premeasured based on a calibration process performed with respect to the camera and the display panel prior to capturing the original image. In particular embodiments, the electronic device may then estimate an optimal regularization parameter for the original image based on the one or more predetermined PSFs and the one or more blurring artifacts. For example, in particular embodiments, the optimal regularization parameter may be estimated based on a bounded function.

In particular embodiments, the electronic device may estimate the optimal regularization parameter by converting a first function representing the original image from a spatial domain to a frequency domain to generate a first frequency domain representation of the original image and converting a second function representing the one or more predetermined PSFs from the spatial domain to the frequency domain to generate a second frequency domain representation of the one or more predetermined PSFs. For example, in particular embodiments, the electronic device may then estimate the optimal regularization parameter based on the first frequency domain representation and the second frequency domain representation. In particular embodiments, the electronic device may then apply a self-regularizing inverse filter to the original image based on the estimated regularization parameter. For example, in particular embodiments, the electronic device may apply the self-regularizing inverse filter to the original image by generating an inverse kernel matrix based on the estimated regularization parameter, in which the inverse kernel matrix may be generated utilizing the self-regularizing inverse filter. In particular embodiments, the electronic device may then generate a frequency domain representation of the deblurred image, in which the frequency domain representation of the deblurred image may be generated based on the inverse kernel matrix and the first frequency domain representation of the original image.

In particular embodiments, the electronic device may then generate a deblurred image based on the self-regularizing inverse filter. For example, in particular embodiments, the electronic device may generate the deblurred image by reconstructing the original image utilizing the self-regularizing inverse filter to remove the one or more blurring artifacts. In particular embodiments, the electronic device may generate the deblurred image by converting the frequency domain representation of the deblurred image from the frequency domain to the spatial domain to generate the deblurred image. For example, in particular embodiments, the deblurred image may be generated in real-time or near real-time with respect to capturing the original image.

In accordance with presently disclosed embodiments, a deblurred image based on a self-regularizing inverse filter may be generated to remove one or more blurring artifacts in real-time or near real-time. In this way, the present embodiments may increase the viewing area and the resolution of the display panel 112 of the electronic device 102 by disposing one or more front-facing cameras 110 of the electronic device 102 behind the display panel 112. For example, because of the increase in display area (e.g., having eliminated the display area typically designated for the one or more front-facing cameras 110), the electronic device 102 may further provide for improved (GUIs) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device 102, as well as allow a user of the electronic device 102 to display higher resolution images on the display panel 112 of the electronic device 102. Still further, because the one or more front-facing cameras 110 may be placed behind the display panel 112, the present techniques may allow the one or more front-facing cameras 110 to be placed anywhere, such as in a center area of the display panel 112 (e.g., as opposed to in a corner or along an edge of the display panel 112) of the electronic device 102. This may provide an improved user experience and/or GUI, such as by directing a user taking a selfie to gaze at the center area of the display panel 112, and further by giving the impression of eye-to-eye contact with another user when the user is participating in a videoconference, a videotelephonic exchange, or other video-streaming service.

Furthermore, it should be appreciated that while the present embodiments are described primarily with respect to deblurring based on a self-regularizing inverse filter to remove one or more blurring artifacts in real-time or near real-time from images captured by a camera disposed behind a display of an electronic device, the present embodiments further contemplate deblurring based on a self-regularizing inverse filter to remove one or more blurring artifacts in real-time or near real-time from images captured utilizing any suitable arrangements of cameras, light sources, and so forth. As such, the present embodiments as described herein may be used for deblurring based on a self-regularizing inverse filter to remove one or more blurring artifacts in real-time or near real-time from images in any system where images captured may be distorted (e.g., blurred) or corrupted.

For example, in addition to a camera disposed behind a display panel, the particular embodiments may equally apply to applications in which, for example, an image is captured through micro-perforations utilizing a concealed camera and/or utilizing an inverse filter to generate a higher-quality image than that achievable by less advanced optical devices. In some embodiments, the self-regularizing inverse filter may be an approximation to the conventional regularized inverse filter. In some embodiments, the self-regularizing inverse filter can perform real-time or near real-time deblurring of a blurry image captured from an optical (or digital, computational, physical, etc.) system, where there is high agreement of the point spread function (PSF) across instances of when the optical system is being used.

As used herein, an "optimal value" may refer to a parameter calculated by an iterative optimization procedure that may be symbolic, numeric in nature, or both. As further used herein, an "optimal value" may refer to a target value, an ideal value, or other desired value that is otherwise not unique. Similarly, as used herein, "estimate" may refer to an approximation to deduce the optimal value (e.g., a target value, an ideal value, or other desired value) that would be otherwise determined by optimization (e.g., optimized).

FIG. 1A illustrates an example diagram 100A of an electronic device 102 that may be useful in generating a deblurred image based on a self-regularizing inverse filter to remove one or more blurring artifacts in real-time or near real-time, in accordance with the presently disclosed embodiments. In particular embodiments, the electronic device 102 may include, for example, any of various personal electronic devices 102, such as a mobile phone electronic device, a tablet computer electronic device, a laptop computer electronic device, and so forth. In particular embodiments, as further depicted by FIG. 1A, the personal electronic device 102 may include, among other things, one or more processor(s) 104, memory 106, sensors 108, cameras 110, a display panel 112, input structures 114, network interfaces 116, a power source 118, and an input/output (I/O) interface 120. It should be noted that FIG. 1A is merely one example of a particular implementation and is intended to illustrate the types of components that may be included as part of the electronic device 102.

In particular embodiments, the one or more processor(s) 104 may be operably coupled with the memory 106 to perform various algorithms for providing interactive music conducting and composing activity through intelligence-based learning progression. Such programs or instructions executed by the processor(s) 104 may be stored in any suitable article of manufacture that includes one or more tangible, computer-readable media at least collectively storing the instructions or routines, such as the memory 106. The memory 106 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 104 to enable the electronic device 102 to provide various functionalities.

In particular embodiments, the sensors 108 may include, for example, one or more cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). The cameras 110 may include any number of cameras (e.g., wide cameras, narrow cameras, telephoto cameras, ultra-wide cameras, depth cameras, and so forth) that may be utilized to capture various 2D and 3D images. The display panel 112 may include any display architecture (e.g., AMLCD, AMOLED, micro-LED, and so forth), which may provide further means by which users may interact and engage with the electronic device 102. In particular embodiments, as further illustrated by FIG. 1A, one more of the cameras 110 may be disposed behind or underneath (e.g., as indicated by the dashed lines of electronic device 102) the display panel 112 (e.g., one or more of the cameras 110 may be completely concealed by the display panel 112), and thus the display panel 112 may include a transparent pixel region and/or semi-transparent pixel region through which the one or more concealed cameras 110 may detect light, and, by extension, capture images. It should be appreciated that the one more of the cameras 110 may be disposed anywhere behind or underneath the display panel 112, such as at a center area behind the display panel 112, at an upper area behind the display panel 112, or at a lower area behind the display panel 112.

In particular embodiments, the input structures 114 may include any physical structures utilized to control one or more global functions of the electronic device 102 (e.g., pressing a button to power "ON" or power "OFF" the electronic device 102). The network interface 116 may include, for example, any number of network interfaces suitable for allowing the electronic device 102 to access and receive data over one or more cloud-based networks (e.g., a cloud-based service that may service hundreds or thousands of the electronic device 102 and the associated users corresponding thereto) and/or distributed networks. The power source 118 may include any suitable source of power, such as a rechargeable lithium polymer (Li-poly) battery and/or an alternating current (AC) power converter that may be utilized to power and/or charge the electronic device 102 for operation. Similarly, the I/O interface 120 may be provided to allow the electronic device 102 to interface with various other electronic or computing devices, such as one or more auxiliary electronic devices.

Figure 1B:
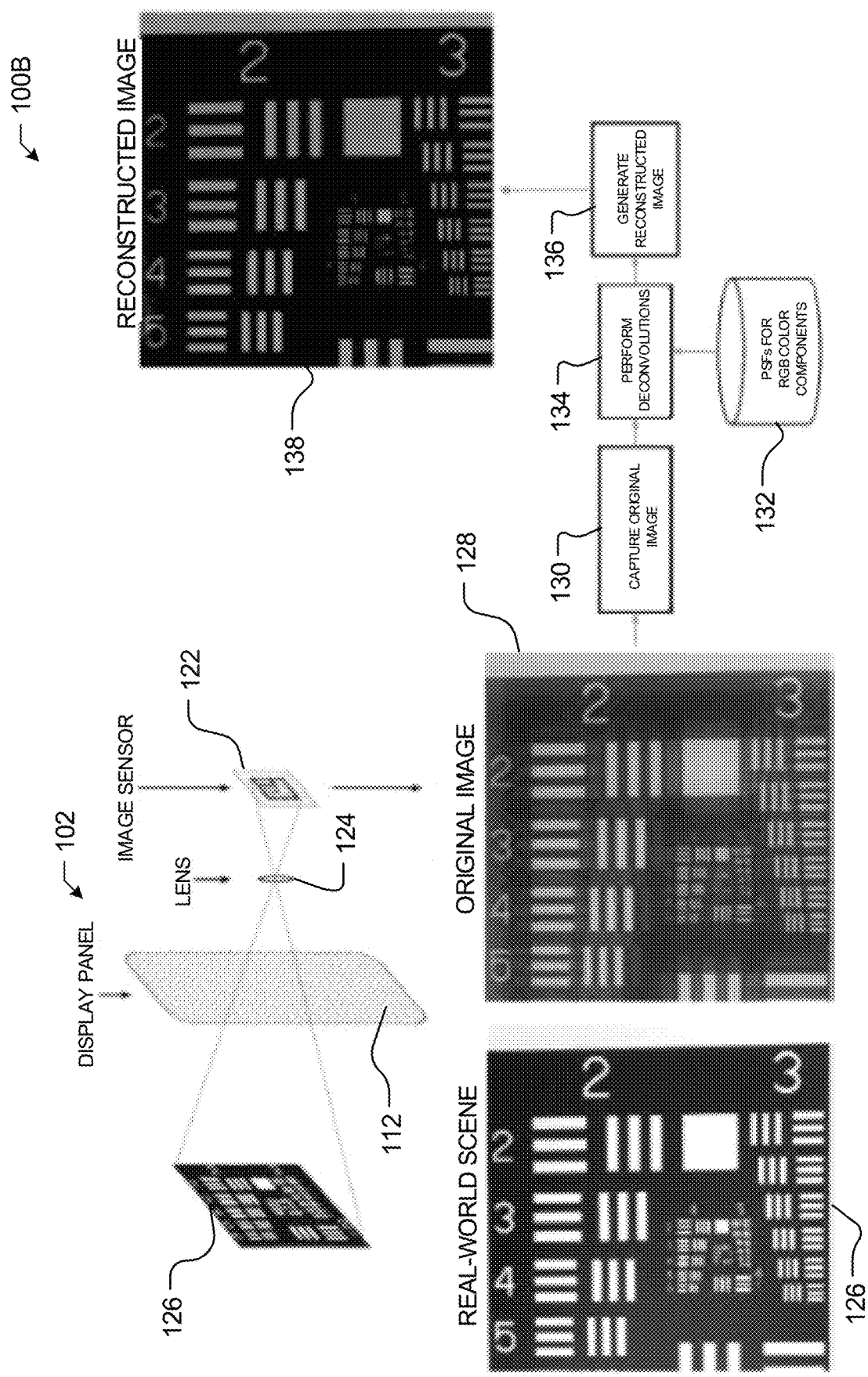
FIG. 1B illustrates an example system and workflow diagram for reconstructing images captured by a camera disposed behind a display of an electronic device.

FIG. 1B illustrates an example system and workflow diagram 100B for reconstructing images captured by a camera disposed behind a display of an electronic device, in accordance with the presently disclosed embodiments. In particular embodiments, the electronic device 102 may capture, by an image sensor 122 and camera lens 124 disposed behind a display panel 112 of the electronic device 102, an image of a real-world scene 126. In particular embodiments, the image of the real-world scene 126 captured by the image sensor 122 may correspond to an original image 128. In particular embodiments, based on the image of the real-world scene 126 being captured by the image sensor 122 through the display panel 112, the original image 128 may be degraded (e.g., including one or more blurring artifacts, motion blurring artifacts, noise, or other image distortions). In particular embodiments, after performing (at functional block 150) the capturing of the original image 128, the electronic device 102 may retrieve, for one or more pixel regions of the original image 128, the PSFs (e.g., a function of 3D diffraction pattern of light emitted from an imperceptibly small point light source and captured by one or more image sensors 122) for each of the RGB color components of the original image 128. In particular embodiments, that may be stored on the electronic device 102. In particular embodiments, the electronic device 102 may determine the respective PSF for each of the RGB color components by selecting (at functional block 132), from the memory 106 of the electronic device 102, the premeasured PSFs for each of the RGB color components. In particular embodiments, the electronic device 102 may determine multiple PSFs in various pixel regions of the real-world scene 126 to capture the PSFs' variation with the angle of incidence to the optical axis of the display panel 112, for example.

In particular embodiments, electronic device 102 may then perform (at functional block 134), for the number of pixel regions of the original image 128, a deconvolution of each of the RGB color components of the original image 128 based on their respective PSFs. In particular embodiments, the electronic device 102 may perform the deconvolution of each of the RGB color components by performing a Richardson-Lucy deconvolution of each of the RGB color components or by performing a Tikhonov regularized inverse filter deconvolution of each of the RGB color components. In particular embodiments, other deconvolution techniques may be utilized. In particular embodiments, the electronic device 102 may then generate (at functional block 136) a reconstructed image 138 corresponding to the original image 128 based on the deconvolutions of each of the RGB color components. As illustrated by comparison of the original image 128 to the reconstructed image 138, the electronic device 102 may generally generate the reconstructed image 138 by removing a blurring effect of the original image 128.

Figure 2:
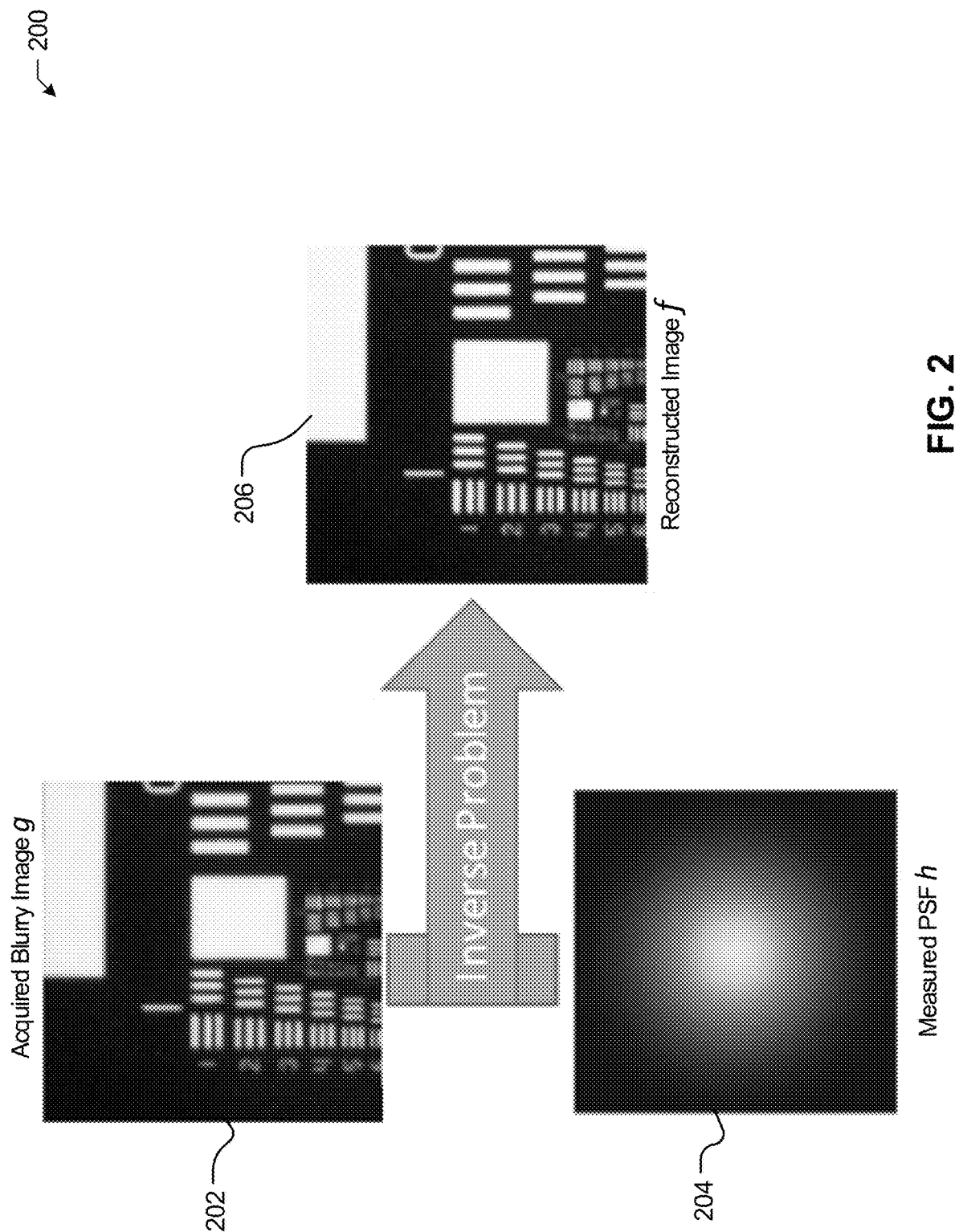
FIG. 2 illustrates an example system and workflow diagram for generating a deblurred image to remove one or more blurring artifacts characterized as an inverse operation.

FIG. 2 illustrates an example system and workflow diagram 200 for generating a deblurred image to remove one or more blurring artifacts characterized as an inverse operation, in accordance with the presently disclosed embodiments. In particular embodiments, to recover a degraded original image, the electronic device 102 may premeasure (e.g., determine experimentally during a calibration process and/or manufacturing process of the electronic device 102) and store the PSFs of the electronic device 102. In particular embodiments, for a captured original blurred image 202 (e.g., g) with a known PSF of the optical system 204 (e.g., h), a deblurred image 206 (e.g., f) can be obtained by performing one or more inverse operations to undo the blurring. Indeed, as will be further appreciated below, generating the deblurred image 206 (e.g., f) image utilizing a self-regularizing inverse filter may allow the electronic device 102 to generate the deblurred image 206 (e.g., f) in real-time or near real-time.

In particular embodiments, as the presently disclosed embodiments are described henceforth: g is the blurred image; h is the measured/estimated PSF of the imaging system; f is the deblurred image to be reconstructed; and $\lambda$ is a regularization parameter (e.g., noise regulating factor). $\lambda$ can denote a generic regularization parameter, $\lambda^*$ can denote a regularization parameter determined by an iterative optimization of a conventional approach, and $\lambda$ can denote a regularization parameter that is estimated or approximated by the disclosed technology. For example, when $\lambda$ takes larger value, the final deblurred image will contain less high spatial frequency noise or it will appear smoother. In particular embodiments, the regularized inverse filter as a constrained optimization function may be expressed as $$\underset{f}{\operatorname{argmin}} \sum_{i,j} |g_{ij} - (h*f)_{ij}|^2 + \lambda \sum_{i,j} |(p*f)_{ij}|^2 \quad \text{(Equation 1)}$$

$$\text{subject to } \sum_{i,j} |g_{ij} - (h*f)_{ij}|^2 = \eta \quad \text{(Equation 2)}$$

In particular embodiment, referring to Equation 1 and Equation 2, * denotes convolution, i and j are row and column indices over the image(s), $\eta$ is an estimate of total noise power in the captured image g, and p is a filter kernel which appears in the regularization term of Equation 1 to enforce smoothness of the solution f. In particular embodiments, p is taken to be the discrete Laplacian operator:

$$p = \begin{bmatrix} 0 & 1 & 0 \\ 1 & -4 & 1 \\ 0 & 1 & 0 \end{bmatrix} \quad \text{(Equation 3)}$$

In particular embodiments, for example, by Parseval's theorem, Equation 1 is equivalent to the following expression, where G, H, and F are the Fourier transforms of g, h, and f, while P is the Fourier transform of the filter kernel p after zero-padding to the same size as g, h, and f.

$$F^* = \underset{F}{\operatorname{argmin}} \sum_{i,j} |G_{ij} - H_{ij}F_{ij}|^2 + \lambda|P_{ij}F_{ij}|^2 \quad \text{(Equation 4)}$$

To find the solution F*, substitute F=WG and factor out G to obtain:

$$W^* = \underset{W}{\operatorname{argmin}} \sum_{i,j} |G_{ij}|^2 \left[ |1 - H_{ij}W_{ij}|^2 + \lambda|P_{ij}W_{ij}|^2 \right] \quad \text{(Equation 5)}$$

In particular embodiments, the indices i, j may be omitted for readability. A solution is found by setting the derivative of the RHS of (5) to zero for all terms:

$$\frac{\partial}{\partial W} |G|^2 \left[ 1 - 2HW + (|H|^2 + \lambda|P|^2)|W|^2 \right] = \quad \text{(Equation 6)}$$

$$G^2 \left[ -2H + 2(|H|^2 + \lambda|P|^2)W^* \right] = 0$$

In particular embodiments, this equality can be rearranged to obtain an expression for F:

$$(|H|^2 + \lambda|P|^2)W^* = H \Rightarrow W = \frac{H^*}{|H|^2 + \lambda|P|^2} \quad \text{(Equation 7)}$$

$$F = WG = \frac{H^*G}{|H|^2 + \lambda|P|^2}$$

In particular embodiments, in Equation 7, F is the desired result (the deblurred image 206), G is the original blurred image (e.g., original blurred image 202), and W is the regularized inverse filter, all in the frequency domain. In particular embodiments, because H, P, and G are all known, the parameter remaining to be determined is $\lambda$. For example, in particular embodiments, the optimized regularization parameter $\lambda^*$ (e.g., noise regulating factor) for optimal reconstruction, may be determined based on the solution of an optimization function as determined by:

$$\lambda^* = \underset{\lambda}{\operatorname{argmin}} f(\lambda) = \underset{\lambda}{\operatorname{argmin}} \left| \left[ \sum |G|^2 \frac{\lambda^2|P|^4}{(|H|^2 + \lambda|P|^2)^2} \right] - \eta \right| \quad \text{(Equation 8)}$$

In particular embodiments, however, the solution to the optimization function as determined by Equation 8 may be computationally expensive, and thus may be unsuitable to be utilized in real-time or near real-time image deblurring. For example, in particular embodiments, because on every iteration of Equation 8, the right hand-side (RHS) of Equation (8) may be evaluated and an update to the regularization parameter $\lambda$ may be recomputed (e.g., typically including dozens or hundreds of iterations). Accordingly, to render Equation 8 computationally feasible to be utilize by the electronic device 102 to perform real-time or near real-time image deblurring, it may be useful to provide techniques, for example, to reduce Equation 8 to a single computation (e.g., as opposed to one performed over dozens or hundreds of iterations). For example, as will be further appreciated with respect to at least FIGS. 3, 4B, and 5, the electronic device 102 may estimate the approximate value of the optimal regularization parameter $\lambda$ for any original image (e.g., original blurred image 202) with a predetermined or measured PSF 204 and known blurring function, therefore allowing the computation to be performed in bounded time and suitable for real-time deblurring.

Figure 3:
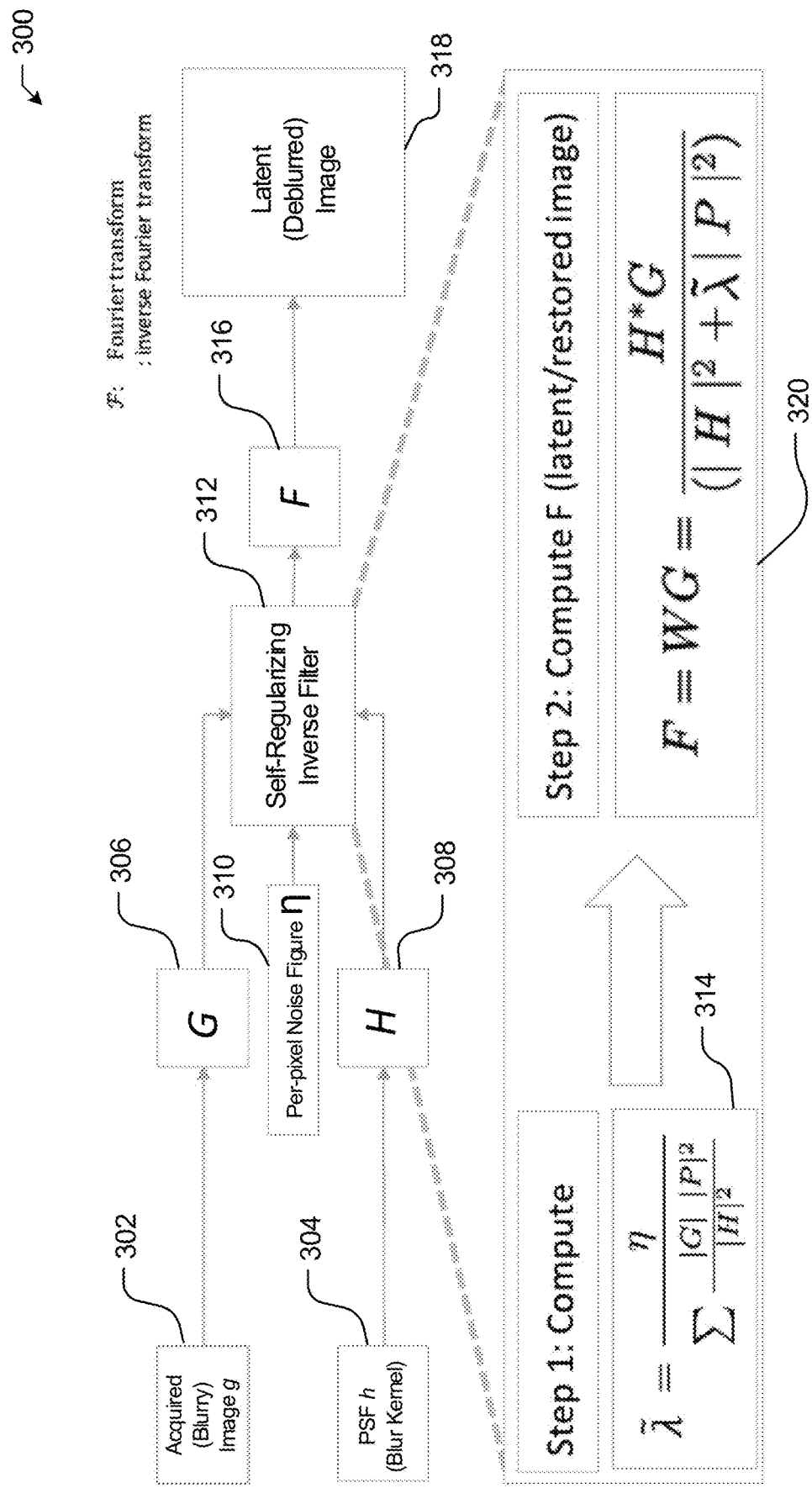
FIG. 3 illustrates a workflow diagram in generating a deblurred image based on a self-regularizing inverse filter to remove one or more blurring artifacts in real-time or near real-time.

FIG. 3 illustrates a workflow diagram 300 for useful in generating a deblurred image based on a self-regularizing inverse filter to remove one or more blurring artifacts in real-time or near real-time, in accordance with the presently disclosed embodiments. In particular embodiments, as depicted by the workflow diagram 300, the original blurred image 302 (e.g., g) may be converted from the spatial domain to the frequency domain to generate a frequency domain representation 306 (e.g., G) of the original blurred image 302 (e.g., g). Similarly, the one or more predetermined PSFs 304 (e.g., h) may be converted from the spatial domain to the frequency domain to generate a frequency domain representation 308 (e.g., H) of the one or more predetermined PSFs.

For example, in particular embodiments, the original blurred image 302 (e.g., g) may be converted to the frequency domain representation 306 (e.g., G) and the one or more predetermined PSFs 304 (e.g., h) may be converted to the frequency domain representation 308 (e.g., H) utilizing, for example, one or more Fourier transforms (e.g., one or more discrete Fourier transforms (DFTs) or fast Fourier transforms (FFTs)). In particular embodiments, the frequency domain representation 306 (e.g., G) of the original blurred image 302 (e.g., g) and the frequency domain representation 308 (e.g., H) of the one or more predetermined PSFs 304 (e.g., h) may be input to a self-regularizing inverse filter 312. In particular embodiments, the self-regularizing inverse filter 312 may also receive a per-pixel noise FIG. 310 (e.g., $\eta$). For example, in particular embodiments, the per-pixel noise FIG. 310 (e.g., η) may represent, for example, any noise that may be present or possibly present within the image (e.g., sensor noise).

In particular embodiments, the self-regularizing inverse filter 312 may be utilized to estimate the approximate value of the optimal regularization parameter 314 (e.g., $\tilde{\lambda}$) for the original blurred image 302 (e.g., g) and the one or more predetermined PSFs 304 (e.g., h) based on the frequency domain representation 306 (e.g., G), the frequency domain representation 308 (e.g., H), and the per-pixel noise FIG. 310 (e.g., η). For example, in particular embodiments, the approximate value of the optimal regularization parameter 314 (e.g., may be calculated during single cycle (e.g., a singular calculation in real-time or near real-time as compared to the optimization function as expressed by Equation 8, which may be determined only through dozens or hundreds of iterations), and may be expressed as:

$$\tilde{\lambda} = \frac{\eta}{\sum_{i,j} \frac{|G_{ij}||P_{ij}|^2}{|H_{ij}|^2}} \quad \text{(Equation 9)}$$

In particular embodiments, the self-regularizing inverse filter 312 may then utilize the approximate value of the optimal regularization parameter 314 (e.g., $\tilde{\lambda}$) to generate a frequency domain representation 316 (e.g., F) of the deblurred image 318 (e.g., f). For example, in particular embodiments, the frequency domain representation 316 (e.g., F) may be expressed as:

$$F = WG = \frac{H^*G}{|H|^2 + \tilde{\lambda}|P|^2} \quad \text{(Equation 10)}$$

In particular embodiments, the frequency domain representation 316 (e.g., F) may be utilized to generate the deblurred image 318 (e.g., f). For example, in particular embodiments, the frequency domain representation 316 (e.g., F) may be converted to the deblurred image 318 (e.g., f) utilizing, for example, one or more inverse Fourier transforms (e.g., one or more inverse discrete Fourier transforms (IDFTs) or inverse fast Fourier transforms (IFFTs)).

Figure 4A:
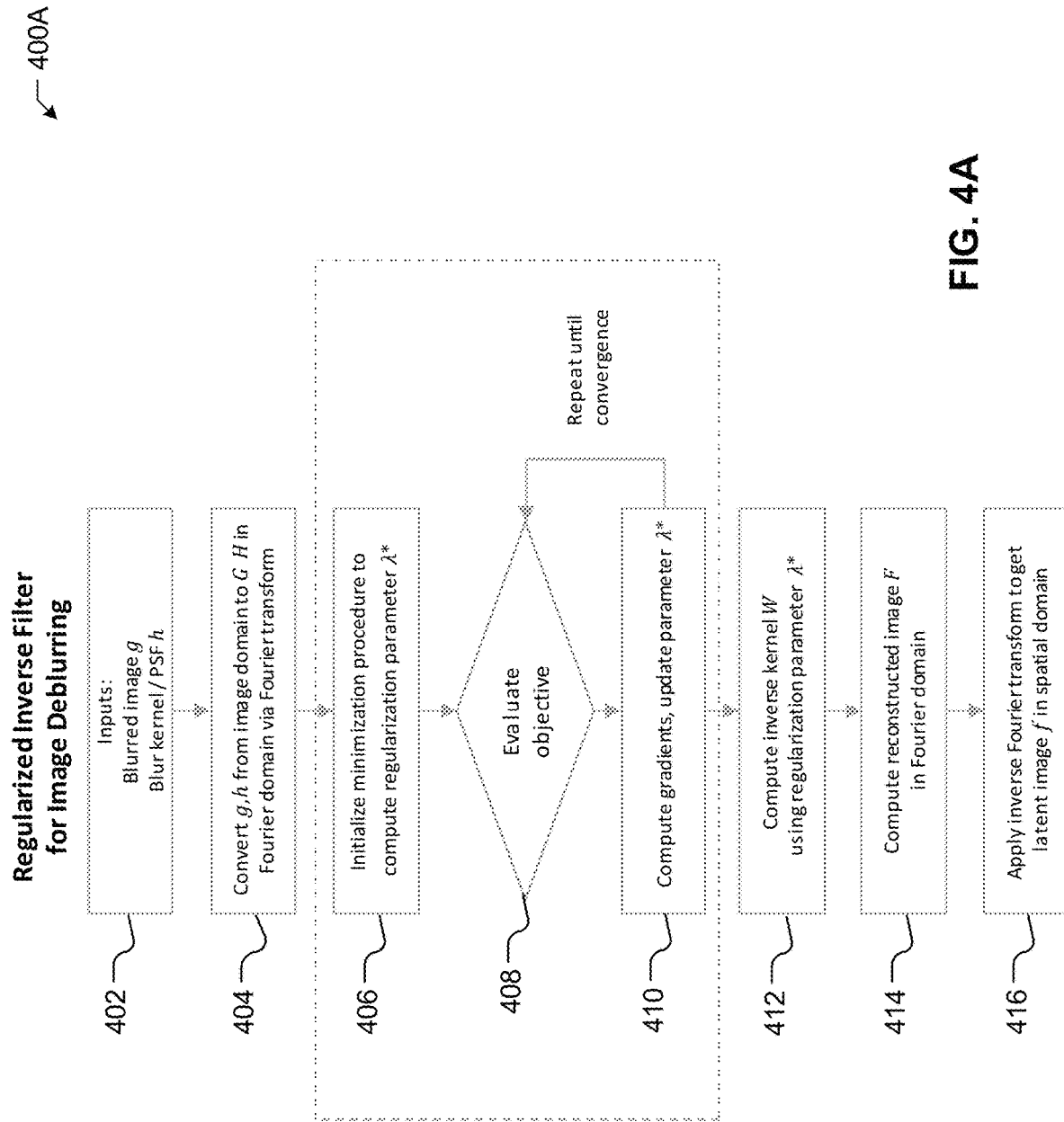
FIG. 4A illustrates a flow diagram of a method for generating a deblurred image based on a regularized inverse filter to remove one or more blurring artifacts.

FIG. 4A illustrates a flow diagram of a method 400A for generating a deblurred image based on a regularized inverse filter to remove one or more blurring artifacts. The method 400A may be performed utilizing one or more processing devices (e.g., the one or more processors 104 of the electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400A may begin at block 402 with the one or more processing devices (e.g., the one or more processors 104 of the electronic device 102) receiving as inputs an original blurred image g and one or more predetermined PSFs h (e.g., blur kernel). The method 400A may then continue at block 404 with the one or more processing devices (e.g., the one or more processors 104 of the electronic device 102) converting, via one or more Fourier transforms, the original blurred image g and the one or more predetermined PSFs from the spatial domain to respective frequency domain representations G and H. The method 400A may then continue at block 406 with the one or more processing devices (e.g., the one or more processors 104 of the electronic device 102) initializing a minimization process to compute the optimized regularization parameter λ*. The method 400A may then continue at decision 408 with the one or more processing devices (e.g., the one or more processors 104 of the electronic device 102) evaluating the optimization function as expressed above by Equation 8, which may be performed iteratively until the optimization function converges. The method 400A may then continue at block 410 with the one or more processing devices (e.g., the one or more processors 104 of the electronic device 102) computing one or more gradients and updating the regularization parameter λ.

The method 400A may then continue at block 412 with the one or more processing devices (e.g., the one or more processors 104 of the electronic device 102) computing one or more gradients and updating the regularization parameter λ. The method 400A may then continue at block 412 with the one or more processing devices (e.g., the one or more processors 104 of the electronic device 102) computing an inverse kernel matrix W utilizing the optimized regularization parameter λ*. The method 400A may then continue at block 414 with the one or more processing devices (e.g., the one or more processors 104 of the electronic device 102) computing a frequency domain representation F of the deblurred reconstructed image based on the inverse kernel matrix W. The method 400A may then conclude at block 416 with the one or more processing devices (e.g., the one or more processors 104 of the electronic device 102) applying an inverse Fourier transform (IFFT) to the frequency domain representation F to generate the deblurred image f in the spatial domain.

FIG. 4B illustrates a flow diagram of an improved method 400B (e.g., as compared to the method 400A) for generating a deblurred image based on a self-regularizing inverse filter (e.g., a fast self-regularizing inverse filter) to remove one or more blurring artifacts in real-time or near real-time, in accordance with the presently disclosed embodiments. The method 400B may be performed utilizing one or more processing devices (e.g., the one or more processors 104 of the electronic device 102) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 400B may begin at block 418 with the one or more processing devices (e.g., the one or more processors 104 of the electronic device 102) receiving as inputs an original blurred image g and one or more predetermined PSFs h (e.g., blur kernel). The method 400B may then continue at block 420 with the one or more processing devices (e.g., the one or more processors 104 of the electronic device 102) converting, via one or more Fourier transforms, the original blurred image g and the one or more predetermined PSFs from the spatial domain to respective frequency domain representations G and H. The method 400B may then continue at block 422 with the one or more processing devices (e.g., the one or more processors 104 of the electronic device 102) estimating the approximate value of the optimal regularization parameter $\tilde{\lambda}$ utilizing a self-regularizing inverse filter as expressed by Equation 9 above. Specifically, the estimated value of the optimal regularization parameter $\tilde{\lambda}$ may be estimated for any original blurred image g with a predetermined PSF h, therefore allowing the computation to be performed in bounded time and suitable for real-time deblurring. For example, in particular embodiments, the estimated regularization parameter may be calculated during single cycle (e.g., a singular calculation in real-time or near real-time as compared to the optimization function as expressed by Equation 8, which may be determined only through dozens or hundreds of iterations or more).

The method 400B may then continue at block 424 with the one or more processing devices (e.g., the one or more processors 104 of the electronic device 102) computing an inverse kernel matrix W utilizing the estimated regularization parameter $\tilde{\lambda}$. The method 400B may then continue at block 426 with the one or more processing devices (e.g., the one or more processors 104 of the electronic device 102) computing a frequency domain representation F of the deblurred reconstructed image based on the inverse kernel matrix W. The method 400A may then conclude at block 428 with the one or more processing devices (e.g., the one or more processors 104 of the electronic device 102) applying an inverse Fourier transform (IFFT) to the frequency domain representation F to generate the deblurred image f in the spatial domain.

Figure 5:
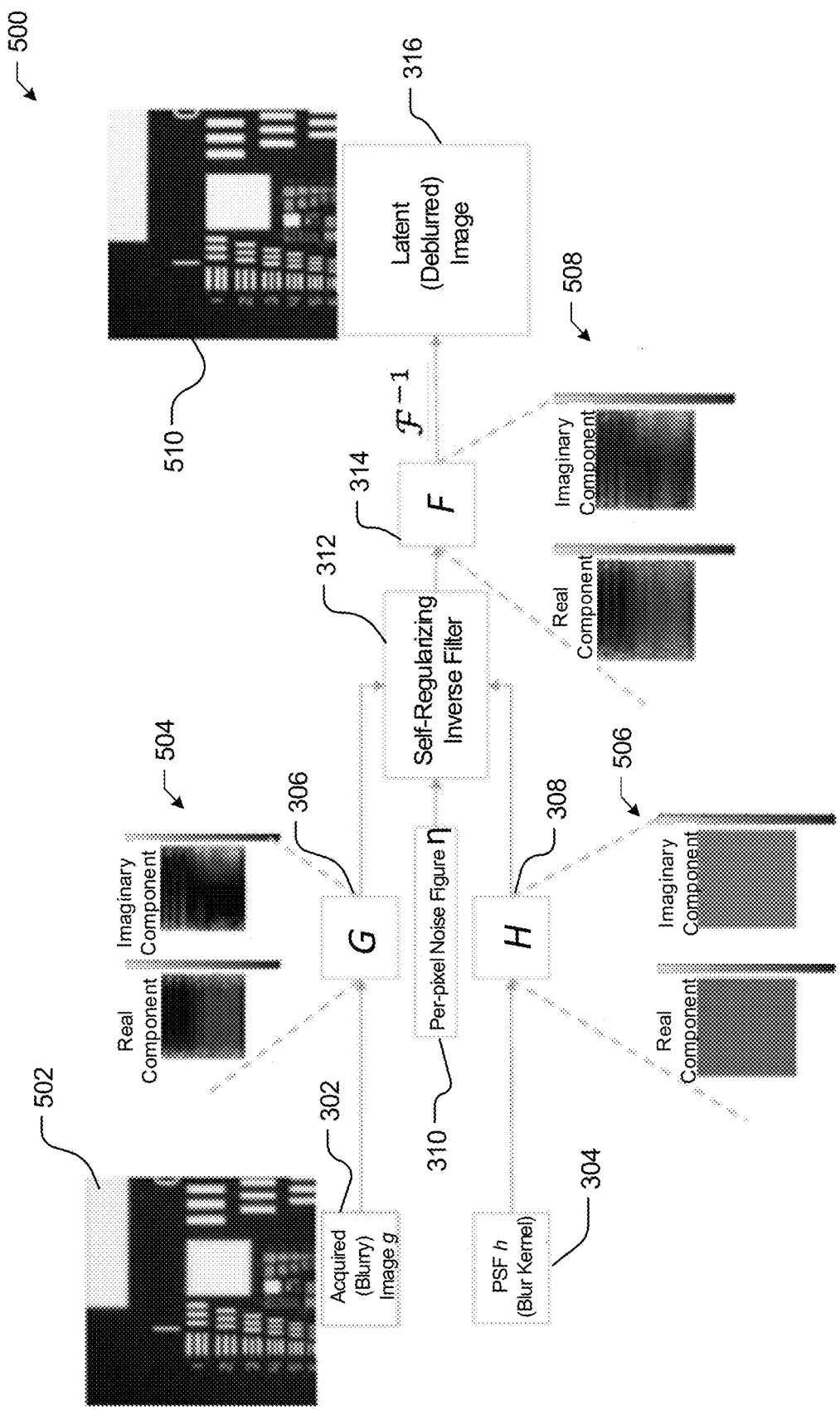
FIG. 5 illustrates a workflow diagram for generating a deblurred image based on a self-regularizing inverse filter to remove one or more blurring artifacts in real-time or near real-time.

FIG. 5 illustrates a workflow diagram 500 for generating a deblurred image based on a self-regularizing inverse filter to remove one or more blurring artifacts in real-time or near real-time, in accordance with the presently disclosed embodiments. Particularly, as depicted, FIG. 5 illustrates an example original blurred image 502 that may be input to the self-regularizing inverse filter 312 and the example deblurred image 510 that may be ultimately output by the self-regularizing inverse filter 312. In particular embodiments, as depicted by the workflow diagram 500, the original blurred image 302 (e.g., g) may be converted from the spatial domain to the frequency domain to generate a frequency domain representation 306 (e.g., G) of the original blurred image 302 (e.g., g). As illustrated, the frequency domain representation 306 (e.g., G) may include a real component and an imaginary component 504. Similarly, the one or more predetermined PSFs 304 (e.g., h) may be converted from the spatial domain to the frequency domain to generate a frequency domain representation 308 (e.g., H) of the one or more predetermined PSFs. The frequency domain representation 308 (e.g., H) may include a real component and an imaginary component 506.

For example, in particular embodiments, the original blurred image 302 (e.g., g) may be converted to the frequency domain representation 306 (e.g., G) and the one or more predetermined PSFs 304 (e.g., h) may be converted to the frequency domain representation 308 (e.g., H) utilizing, for example, one or more Fourier transforms (e.g., one or more DFTs or FFTs). In particular embodiments, the frequency domain representation 306 (e.g., G) of the original blurred image 302 (e.g., g) and the frequency domain representation 308 (e.g., H) of the one or more predetermined PSFs 304 (e.g., h) may be input to a self-regularizing inverse filter 312. In particular embodiments, the self-regularizing inverse filter 312 may also receive a per-pixel noise FIG. 310 (e.g., η). For example, in particular embodiments, the per-pixel noise FIG. 310 (e.g., η) may represent, for example, any noise that may be present or possibly present within the image (e.g., high frequency noise).

In particular embodiments, the self-regularizing inverse filter 312 may be utilized to estimate the approximate value of the optimal regularization parameter 314 (e.g., $\tilde{\lambda}$) for the original blurred image 302 (e.g., g) and the one or more predetermined PSFs 304 (e.g., h) based on the frequency domain representation 306 (e.g., G), the frequency domain representation 308 (e.g., H), and the per-pixel noise FIG. 310 (e.g., η). For example, in particular embodiments, the estimated regularization parameter 314 (e.g., $\tilde{\lambda}$) may be calculated during single cycle (e.g., a singular calculation in real-time or near real-time as compared to the optimization function as expressed by Equation 8, which may be determined only through dozens or hundreds of iterations or more). In particular embodiments, the self-regularizing inverse filter 312 may then utilize the estimated regularization parameter 314 (e.g., $\tilde{\lambda}$) to generate a frequency domain representation 316 (e.g., F) of the deblurred image 318 (e.g., f). In particular embodiments, the frequency domain representation 316 (e.g., F) may include a real component and an imaginary component 508.

In particular embodiments, the frequency domain representation 316 (e.g., F) may be utilized to generate the deblurred image 318 (e.g., f). For example, in particular embodiments, the frequency domain representation 316 (e.g., F) may be converted to the deblurred image 318 (e.g., f) utilizing, for example, one or more inverse Fourier transforms (e.g., one or more IDFTs or IFFTs). For example, as depicted, the example deblurred image 510 outputted by the self-regularizing inverse filter 312 may include no blurring artifacts as compared to, for example, the example original blurred image 502 input to the self-regularizing inverse filter 312.

Figure 6A:
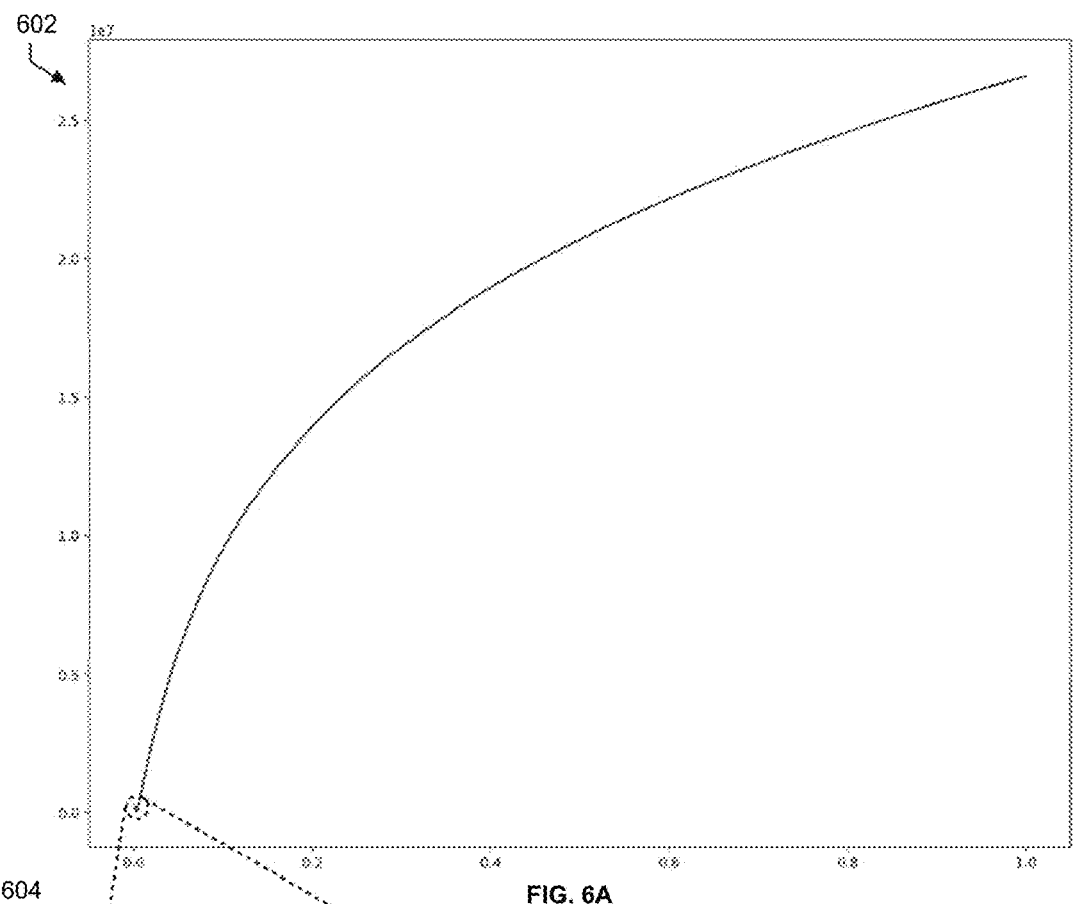
FIG. 6A illustrates an example of the value of an objective function that will be minimized to estimate $\lambda^*$.
Figure 6B:
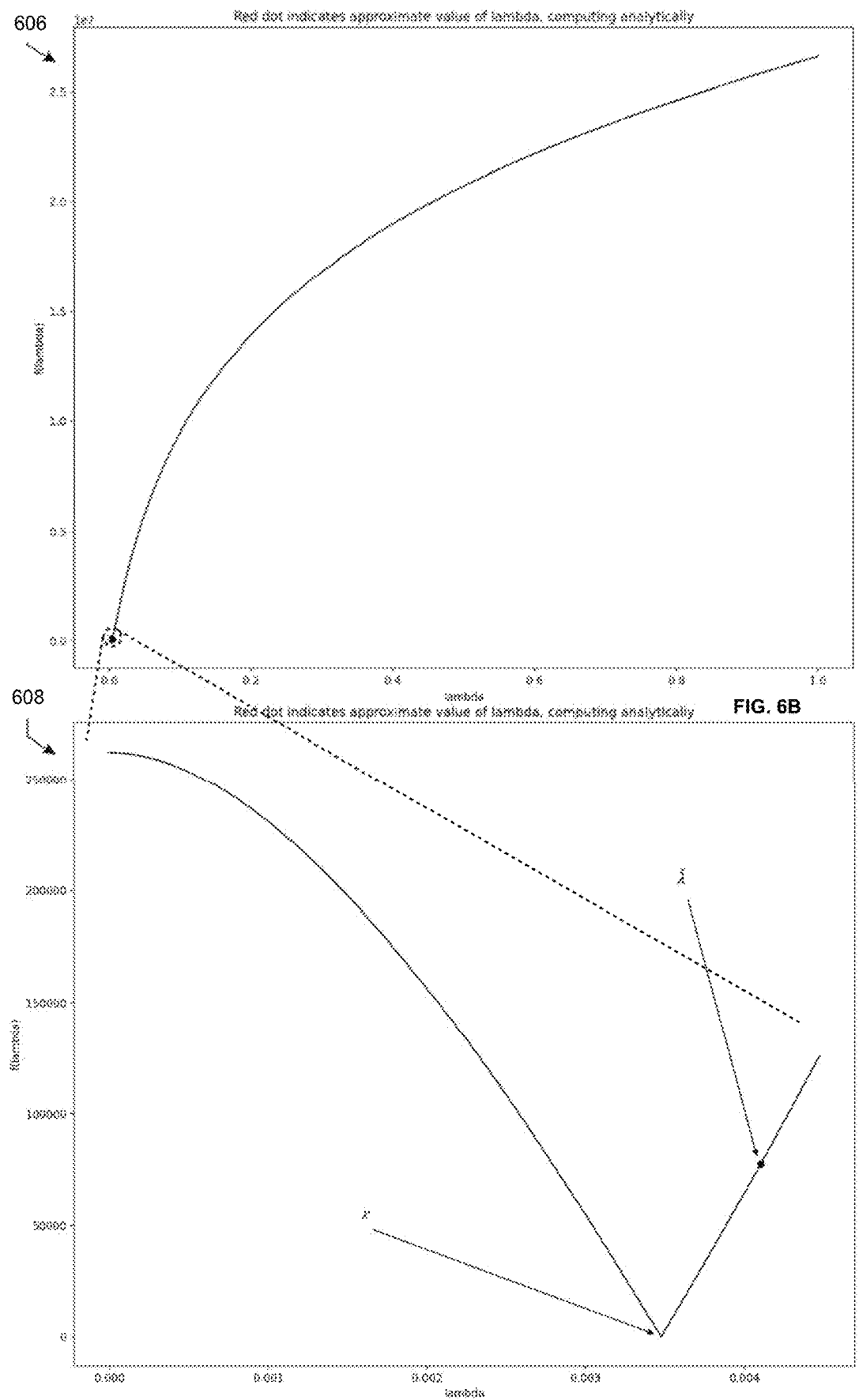
FIG. 6B illustrates an experimental example of the approximate value $\tilde{\lambda}$ of the optimal regularization parameter $\lambda^*$.

FIG. 6A illustrates an example of the value of an objective function that will be minimized to estimate λ*. For example, plot 604 shows a zoomed-in or magnified portion of plot 602. In FIG. 6A, the point where the function is zero, or where the function has an inflection point, is λ*. FIG. 6B illustrates an example of a plot of an estimation of $\tilde{\lambda}$ on a graph of the objective function of FIG. 6A, while FIG. 6B shows how close λ* and $\tilde{\lambda}$ are, in terms of the objective function that is minimized. For example, plot 608 shows a zoomed-in or magnified portion of plot 606. It should be appreciated that any numerical, fractional, decimal, or floating point values described herein with respect to an equation, an expression, or an approximation is included merely for the purpose of illustration and example, and should thus not be understood as limiting any equation, expression, or approximation to any specific value. For example, in particular embodiments, after a number time-consuming and computationally expensive iterations, the optimal regularization parameter value of 0.0042, illustrated by zoomed-in or magnified version 608 of the objective landscape 606, may be determined as the value at which the objective function described by Equation 8 may converge.

In particular embodiments, as previously noted, FIG. 6A illustrates experimental example plots 602 and 604 of the estimated regularization parameter λ*. f(λ) can be further simplified to yield Equation 12.

$$f(\lambda) = \sum \left| \frac{|G|^2}{|P|^4} \frac{\lambda^2 |P|^4}{\left(\frac{|H|^2}{|P|^2} + \lambda\right)^2} - \eta \right| \qquad \text{(Equation 11)}$$

-continued $$f(\lambda) = \sum \left| |G|^2 \frac{\lambda^2}{\left(\frac{|H|^2}{|P|^2} + \lambda\right)^2} - \eta \right| \quad \text{(Equation 12)}$$

In some embodiments, the regularization parameter can be estimated using an approximate closed form solution as described in Equation 13 instead of relying on the iterative optimization.

$$\tilde{\lambda} = \frac{\eta}{\sum \frac{|G||P|^2}{|H|^2}} \quad \text{(Equation 13)}$$

As noted above, FIG. 6B illustrates an experimental example of the approximate value $\tilde{\lambda}$ of the optimal regularization parameter $\lambda^*$, in which the illustrated dot may indicate the approximate analytical solution of Equation 13. In some embodiments, $\tilde{\lambda}$ is an estimated value and may over-estimate or under-estimate the regularization value. In some embodiments, the effectiveness of the estimate can be realized by comparing the image metrics (such as PSNR) of the reconstructed images by either method with respect to ground truth (as illustrated and discussed below with respect to FIG. 10) (e.g., PSNR: Peak Signal to Noise Ratio can refer to the ratio between the maximum possible power of a signal and the power of corrupting noise that affects the fidelity of its representation.) Further, a thorough empirical evaluation is provided using the above mentioned methodology of the effectiveness of $\tilde{\lambda}$ (as illustrated and discussed below with respect to FIG. 12 and FIG. 13).

Figure 7:
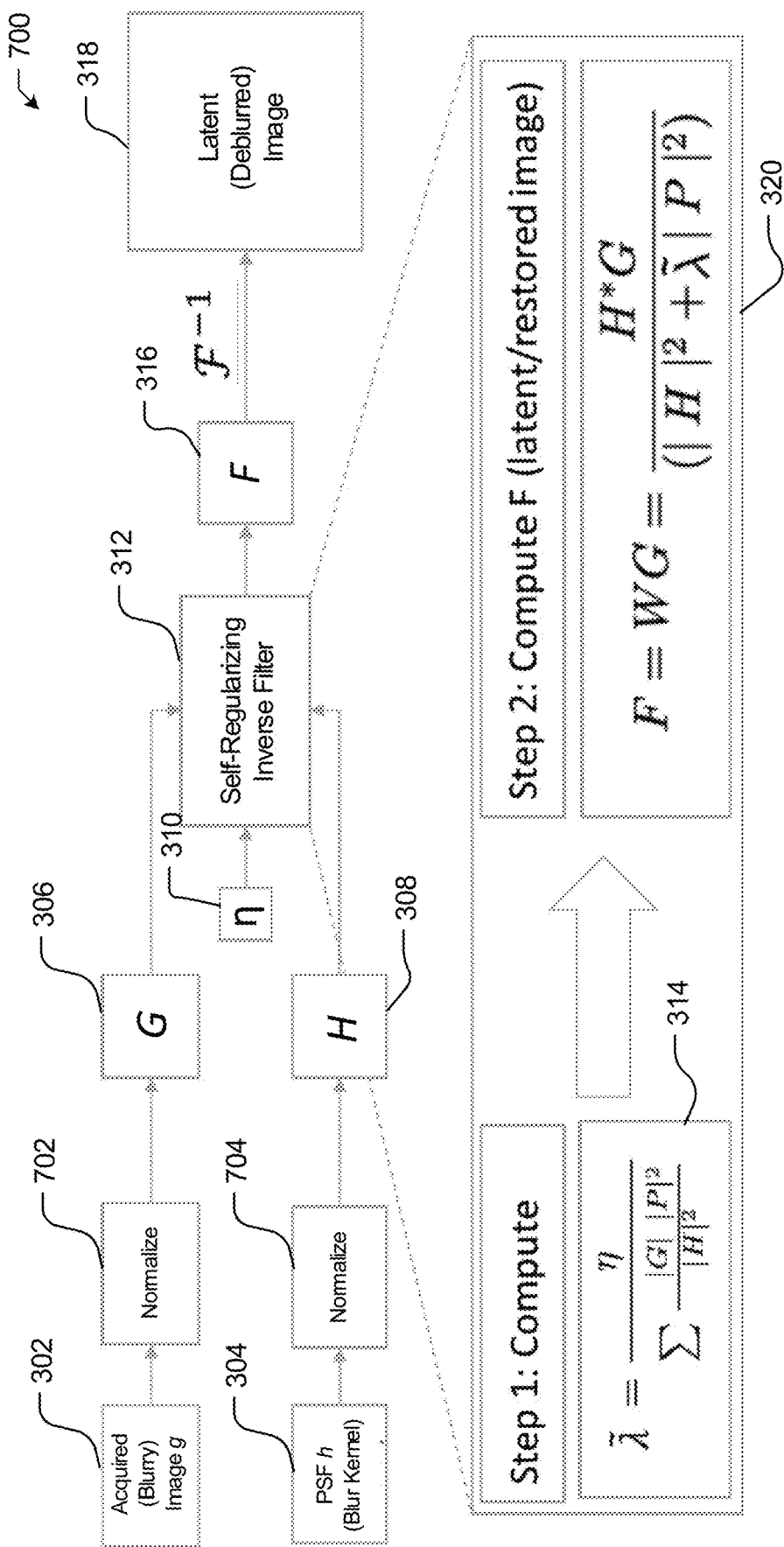
FIG. 7 illustrates a workflow diagram for generating a deblurred image based on a self-regularizing inverse filter to remove one or more blurring artifacts in real-time or near real-time, including an unnormalized raw demosaiced image.

FIG. 7 illustrates a workflow diagram 700 for generating a deblurred image based on a self-regularizing inverse filter to remove one or more blurring artifacts in real-time or near real-time, including an unnormalized demosaiced image as the original blurred image 302 (e.g., g). As depicted, the original blurred image 302 (e.g., g) may be normalized at normalization block 702 and converted from the spatial domain to the frequency domain to generate a frequency domain representation 306 (e.g., G) of the original blurred image 302 (e.g., g). Similarly, the one or more predetermined PSFs 304 (e.g., h) may be normalized at normalization block 704 and converted from the spatial domain to the frequency domain to generate a frequency domain representation 308 (e.g., H) of the one or more predetermined PSFs 304.

For example, in particular embodiments, the original blurred image 302 (e.g., g) may be converted to the frequency domain representation 306 (e.g., G) and the one or more predetermined PSFs 304 (e.g., h) may be converted to the frequency domain representation 308 (e.g., H) utilizing, for example, one or more Fourier transforms (e.g., one or more DFTs or FFTs). In particular embodiments, the frequency domain representation 306 (e.g., G) of the original blurred image 302 (e.g., g) and the frequency domain representation 308 (e.g., H) of the one or more predetermined PSFs 304 (e.g., h) may be input to a self-regularizing inverse filter 312. In particular embodiments, the self-regularizing inverse filter 312 may also receive a per-pixel noise FIG. 310 (e.g., η). For example, in particular embodiments, the per-pixel noise FIG. 310 (e.g., η) may represent, for example, any noise that may be present or possibly present within the image (e.g., high frequency noise).

In particular embodiments, the self-regularizing inverse filter 312 may be utilized to estimate the approximate value of the optimal regularization parameter 314 (e.g., $\tilde{\lambda}$) for the original blurred image 302 (e.g., g) and the one or more predetermined PSFs 304 (e.g., h) based on the frequency domain representation 306 (e.g., G), the frequency domain representation 308 (e.g., H), and the per-pixel noise FIG. 310 (e.g., η). For example, in particular embodiments, the approximate value of the optimal regularization parameter 314 (e.g., $\tilde{\lambda}$) may be calculated during single cycle (e.g., a singular calculation in real-time or near real-time as compared to the optimization function as expressed by Equation 8, which may be determined only through dozens or hundreds of iterations). In particular embodiments, the self-regularizing inverse filter 312 may then utilize the approximate value of the optimal regularization parameter 314 (e.g., $\tilde{\lambda}$) to generate a frequency domain representation 316 (e.g., F) of the deblurred image 318 (e.g., f).

In particular embodiments, the frequency domain representation 316 (e.g., F) may be utilized to generate the deblurred image 318 (e.g., f). For example, in particular embodiments, the frequency domain representation 316 (e.g., F) may be converted to the deblurred image 318 (e.g., f) utilizing, for example, one or more inverse Fourier transforms (e.g., one or more IDFTs or IFFTs).

Figure 8:
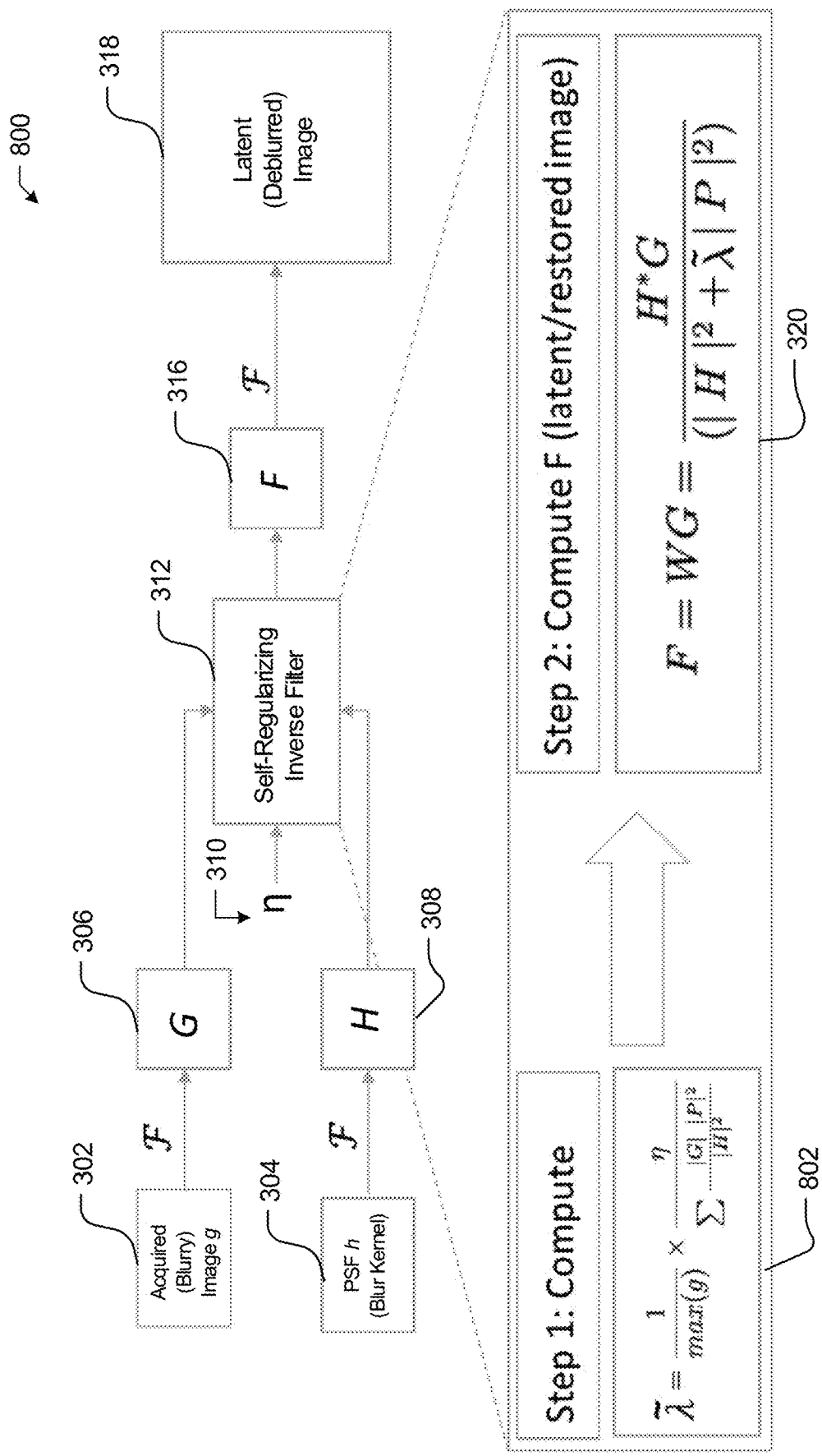
FIG. 8 illustrates a workflow diagram for generating a deblurred image based on a self-regularizing inverse filter to remove one or more blurring artifacts in real-time or near real-time, including an unnormalized raw demosaiced image.

FIG. 8 illustrates a workflow diagram 800 for useful in generating a deblurred image based on a self-regularizing inverse filter to remove one or more blurring artifacts in real-time or near real-time, including an unnormalized raw demosaiced image as the original blurred image 302 (e.g., g) with one or normalizing factors. As depicted, the original blurred image 302 (e.g., g) may be converted from the spatial domain to the frequency domain to generate a frequency domain representation 306 (e.g., G) of the original blurred image 302 (e.g., g). Similarly, the one or more predetermined PSFs 304 (e.g., h) may be converted from the spatial domain to the frequency domain to generate a frequency domain representation 308 (e.g., H) of the one or more predetermined PSFs 304.

For example, in particular embodiments, the original blurred image 302 (e.g., g) may be converted to the frequency domain representation 306 (e.g., G) and the one or more predetermined PSFs 304 (e.g., h) may be converted to the frequency domain representation 308 (e.g., H) utilizing, for example, one or more Fourier transforms (e.g., one or more DFTs or FFTs). In particular embodiments, the frequency domain representation 306 (e.g., G) of the original blurred image 302 (e.g., g) and the frequency domain representation 308 (e.g., H) of the one or more predetermined PSFs 304 (e.g., h) may be input to a self-regularizing inverse filter 312. In particular embodiments, the self-regularizing inverse filter 312 may also receive a per-pixel noise FIG. 310 (e.g., η). For example, in particular embodiments, the per-pixel noise FIG. 310 (e.g., η) may represent, for example, any noise that may be present or possibly present within the image (e.g., high frequency noise).

In particular embodiments, the self-regularizing inverse filter 312 may be utilized to estimate the normalized approximate value of the optimal regularization parameter 802 (e.g., $\tilde{\lambda}$) for the original blurred image 302 (e.g., g) and the one or more predetermined PSFs 304 (e.g., h) based on the frequency domain representation 306 (e.g., G), the frequency domain representation 308 (e.g., H), and the per-pixel noise FIG. 310 (e.g., η). For example, in particular embodiments, the normalized approximate value of the optimal regularization parameter 802 (e.g., $\tilde{\lambda}$) may be expressed as:

$$\tilde{\lambda} = \frac{1}{\max(g)} \times \frac{\eta}{\sum \frac{|G||P|^2}{|H|^2}} \qquad \text{(Equation 14)}$$

In particular embodiments, the self-regularizing inverse filter 312 may then utilize the normalized approximate value of the optimal regularization parameter 802 (e.g., $\tilde{\lambda}$) to generate a frequency domain representation 316 (e.g., F) of the deblurred image 318 (e.g., f). In particular embodiments, the frequency domain representation 316 (e.g., F) may be utilized to generate the deblurred image 318 (e.g., f). For example, in particular embodiments, the frequency domain representation 316 (e.g., F) may be converted to the deblurred image 318 (e.g., f) utilizing, for example, one or more inverse Fourier transforms (e.g., one or more IDFTs or IFFTs).

FIGS. 9A, 9B, 9C, 9D, 9E, 9F, 9G, 9H, 9I, 9J, and 9K, FIG. 10, and FIG. 11 illustrate experimental examples associated with generating a deblurred image based on a self-regularizing inverse filter to remove one or more blurring artifacts in real-time or near real-time (e.g., as described above with respect to method 400B of FIG. 4B) as compared, for example, to generating a deblurred image based merely on a regularized inverse filter through multiple iterations (e.g., as described above with respect to method 400A of FIG. 4A). For example, FIG. 9A illustrates representations that depict a ground-truth ideal example image 902, an original blurred input example image 904, and a deblurred example image 906 based on a regularized inverse filter (e.g., as described above with respect to method 400A of FIG. 4A) generated based on multiple iterations the optimization function described above by Equation 8.

Figure 9A:
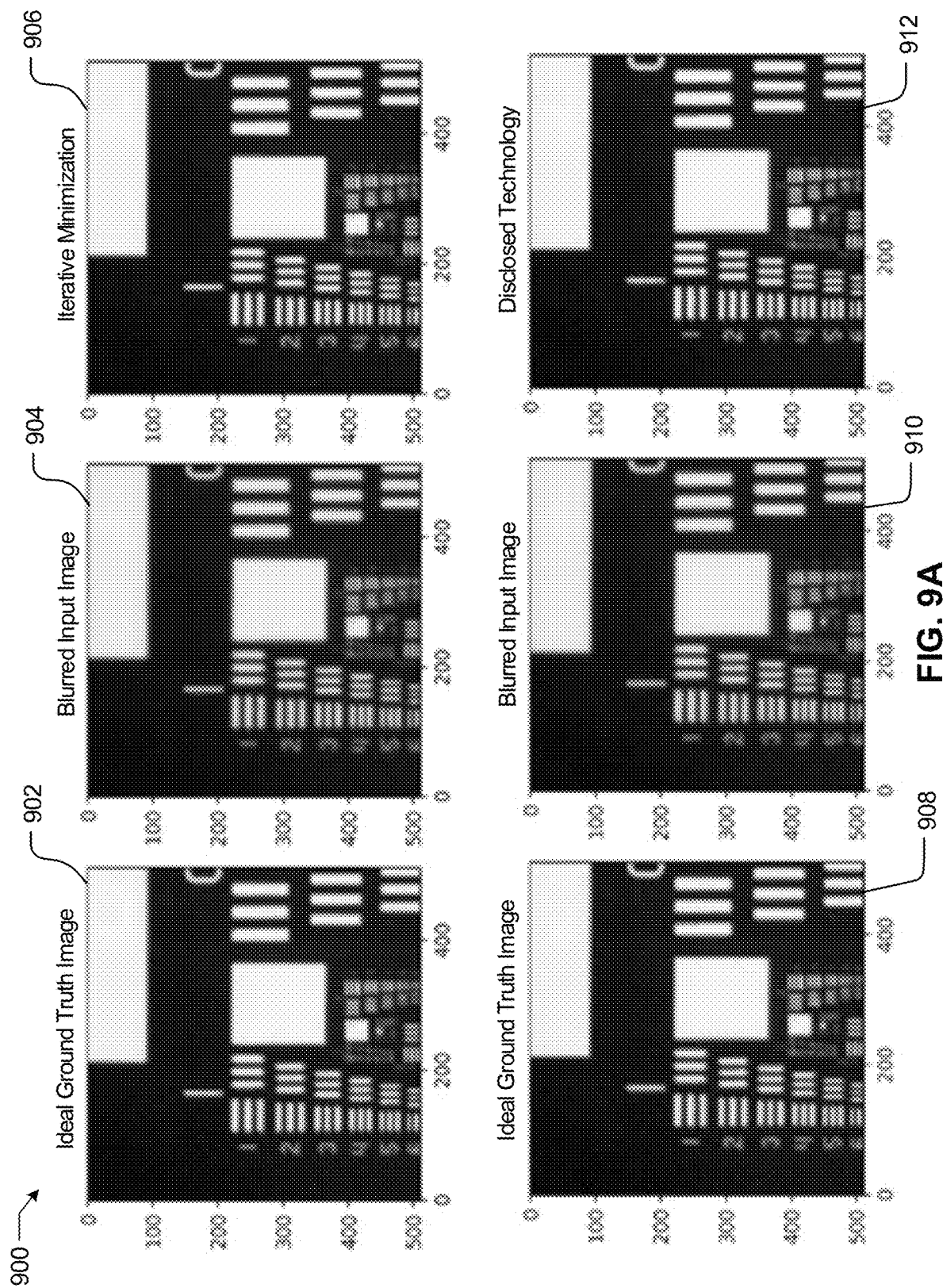
Figure 9C:
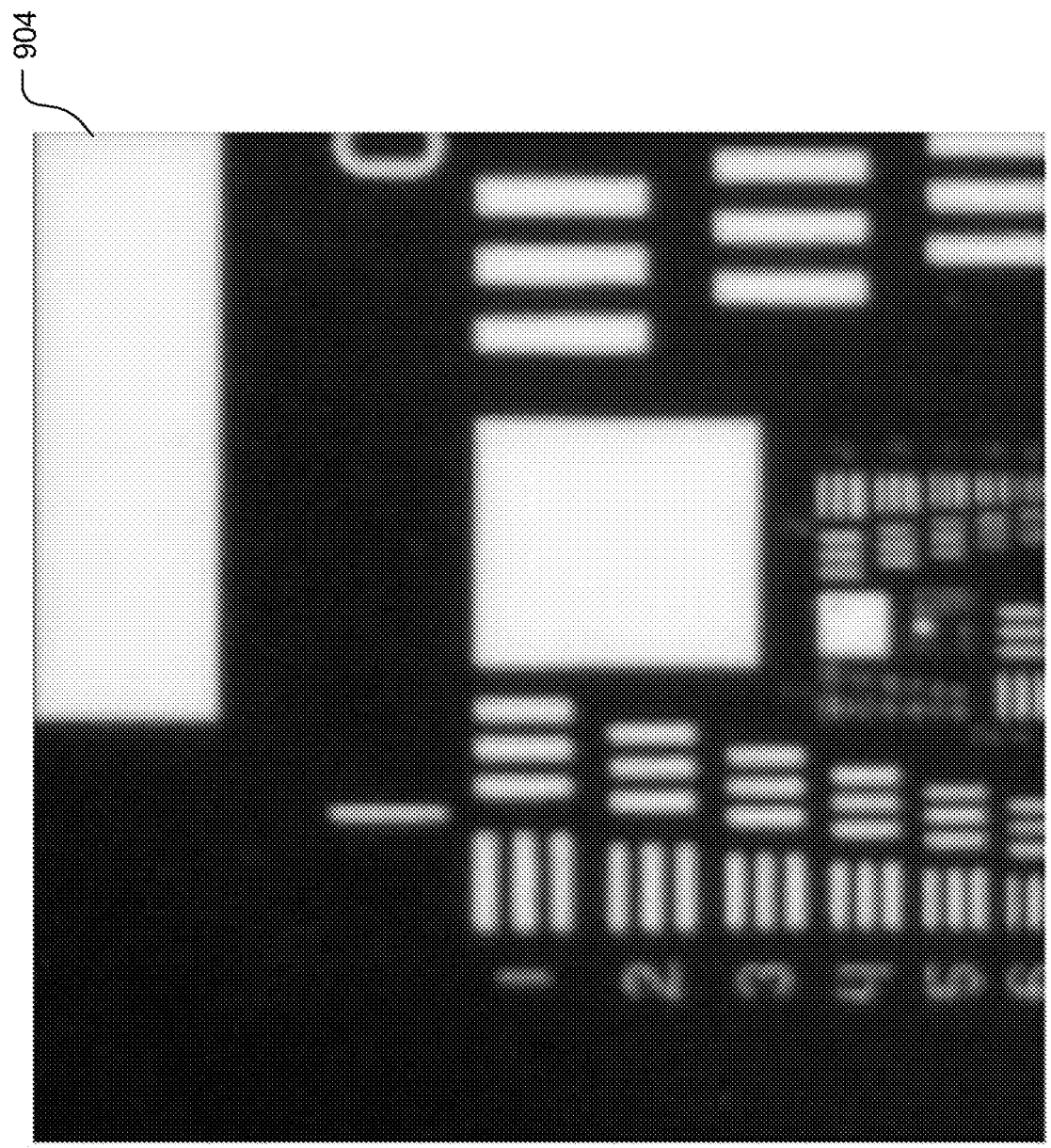
Figure 9D:
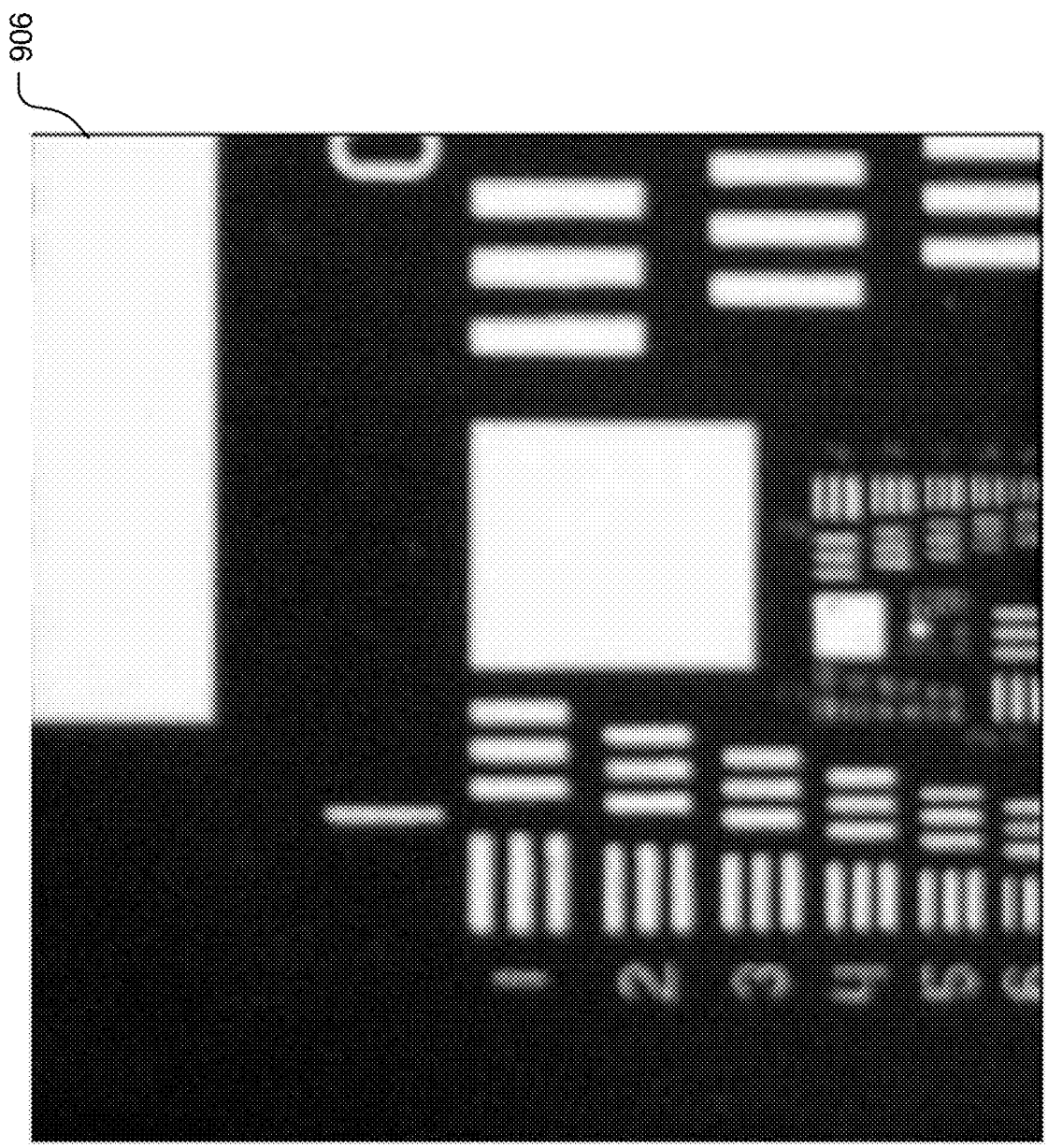
Figure 9E:
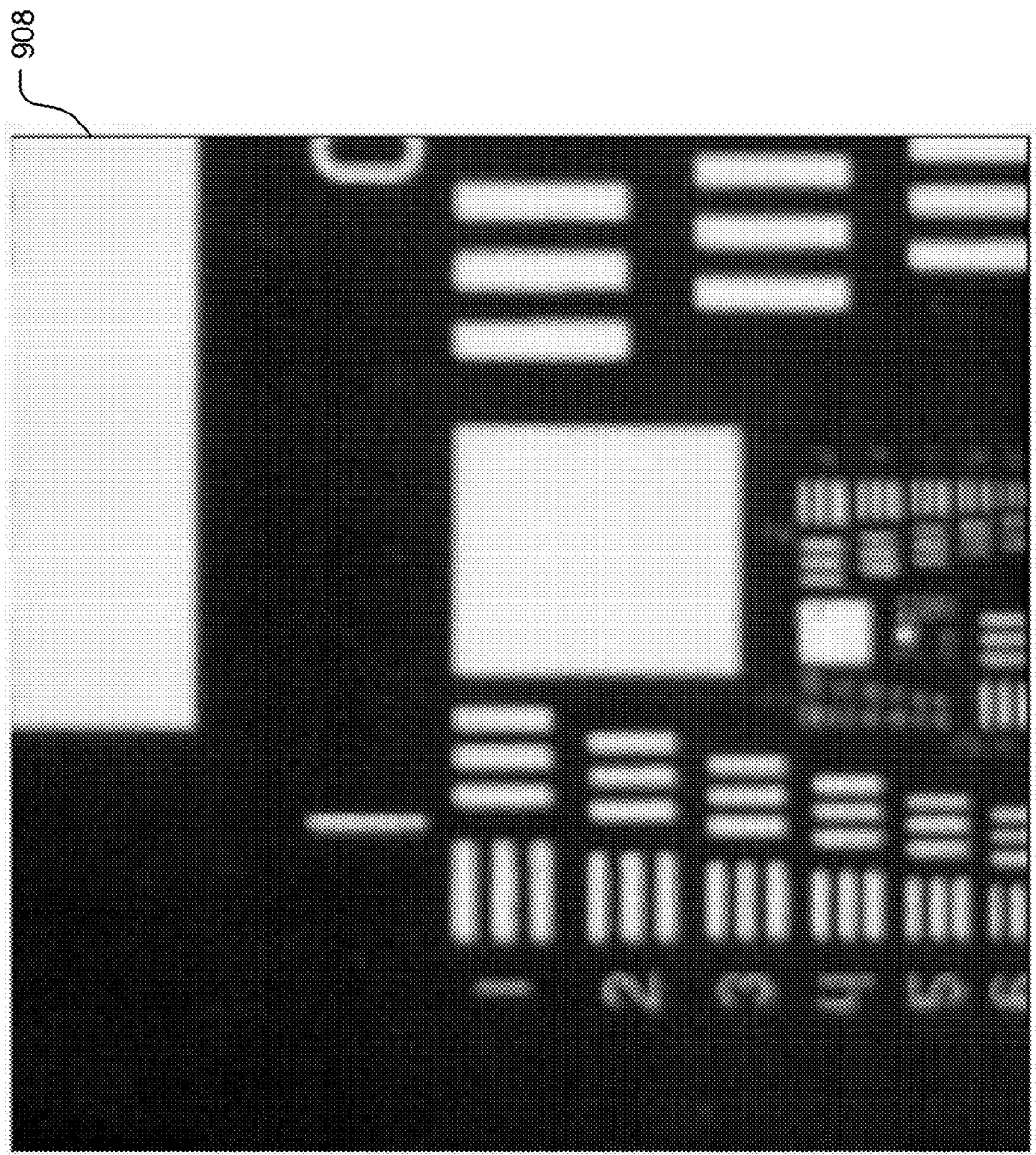

FIG. 9A further depicts another ground-truth ideal example image 908, an original blurred input example image 910, and a deblurred example image 912 based on a self-regularizing inverse filter (e.g., as described above with respect to method 400B of FIG. 4B) generated in real-time or near real-time, in accordance with the presently disclosed embodiments. FIG. 9B illustrates an example representation, in higher resolution, of the example ground-truth image 902 (or 908). FIG. 9C illustrates an example representation, in higher resolution, of the example blurred image 904 (or 910). FIG. 9D illustrates an example representation, in higher resolution, of the example deblurred image 906 produced based on iterative minimization. FIG. 9E illustrates an example representation, in higher resolution, of the deblurred example image 912 produced based on a self-regularizing inverse filter of the disclosed technology.

Figure 9F:
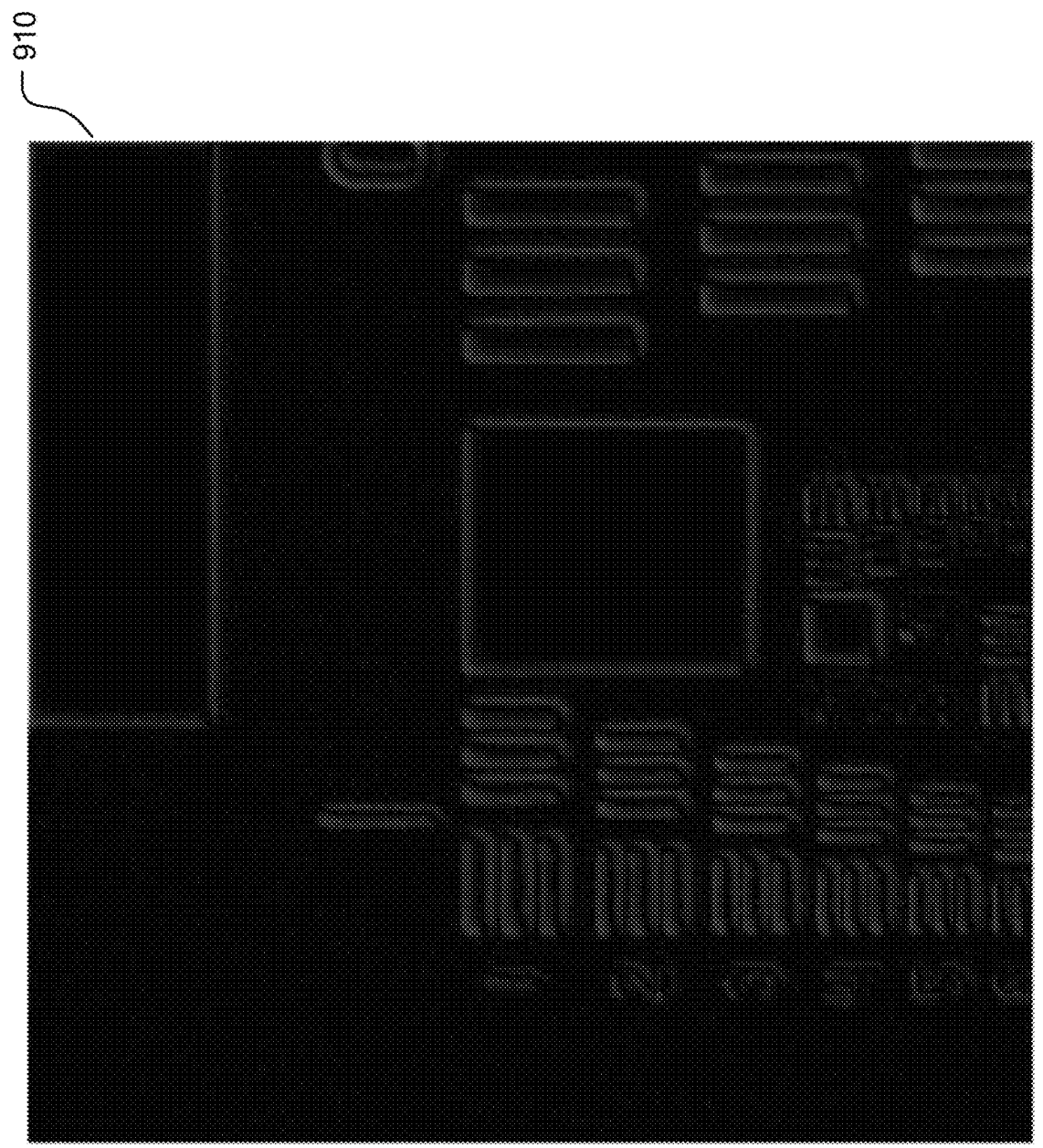
Figure 9G:
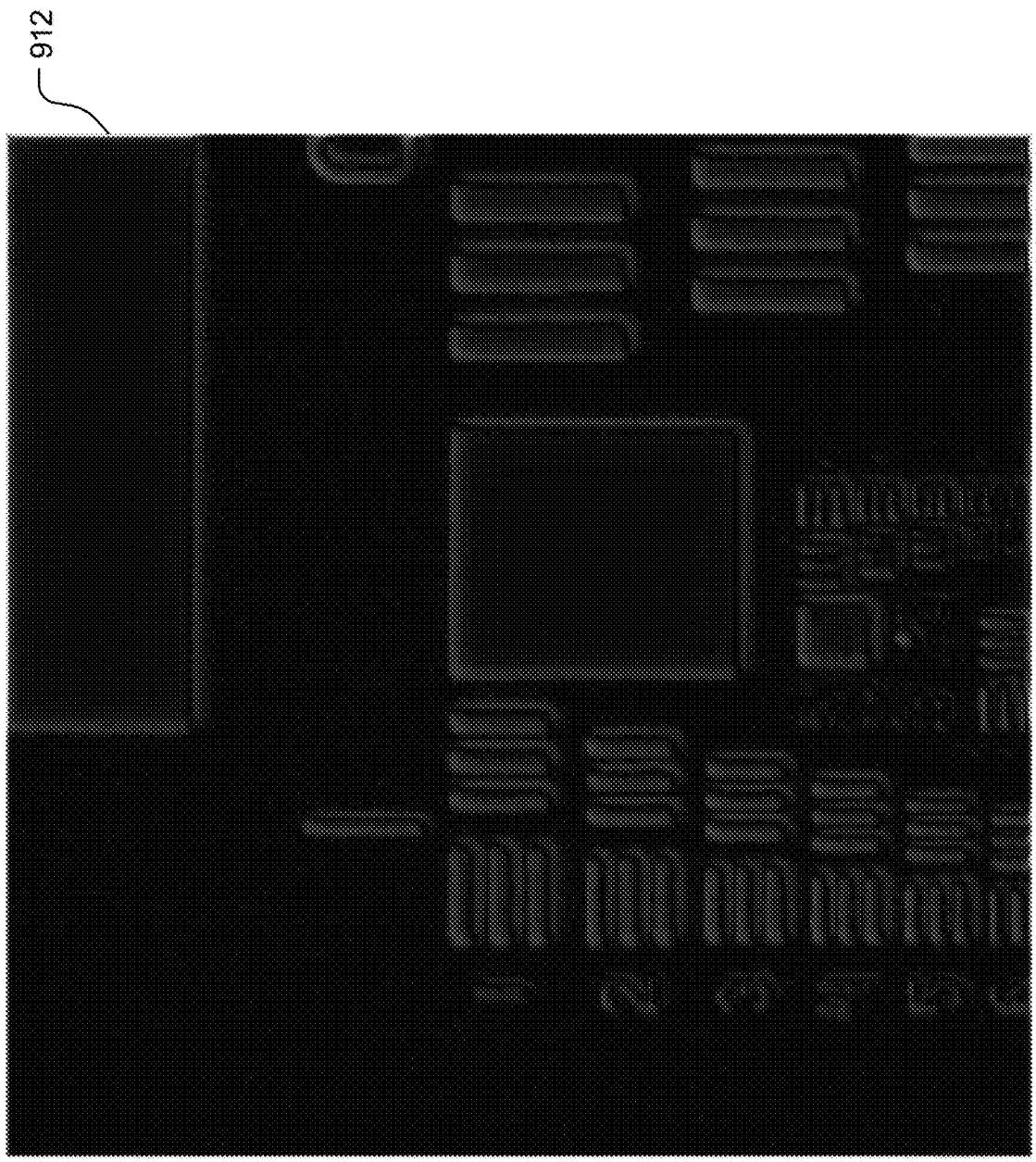
Figure 9H:
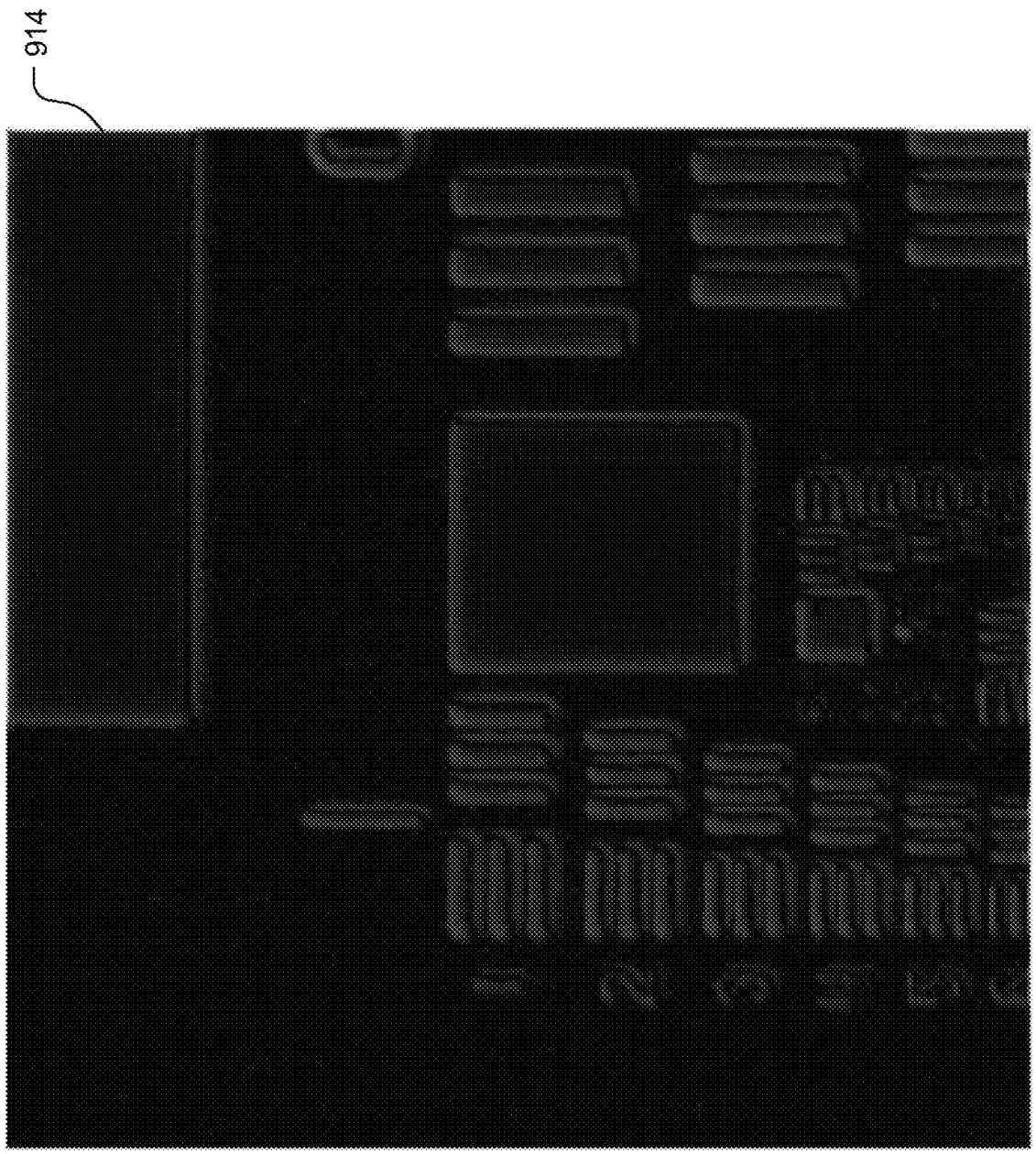
Figure 9I:
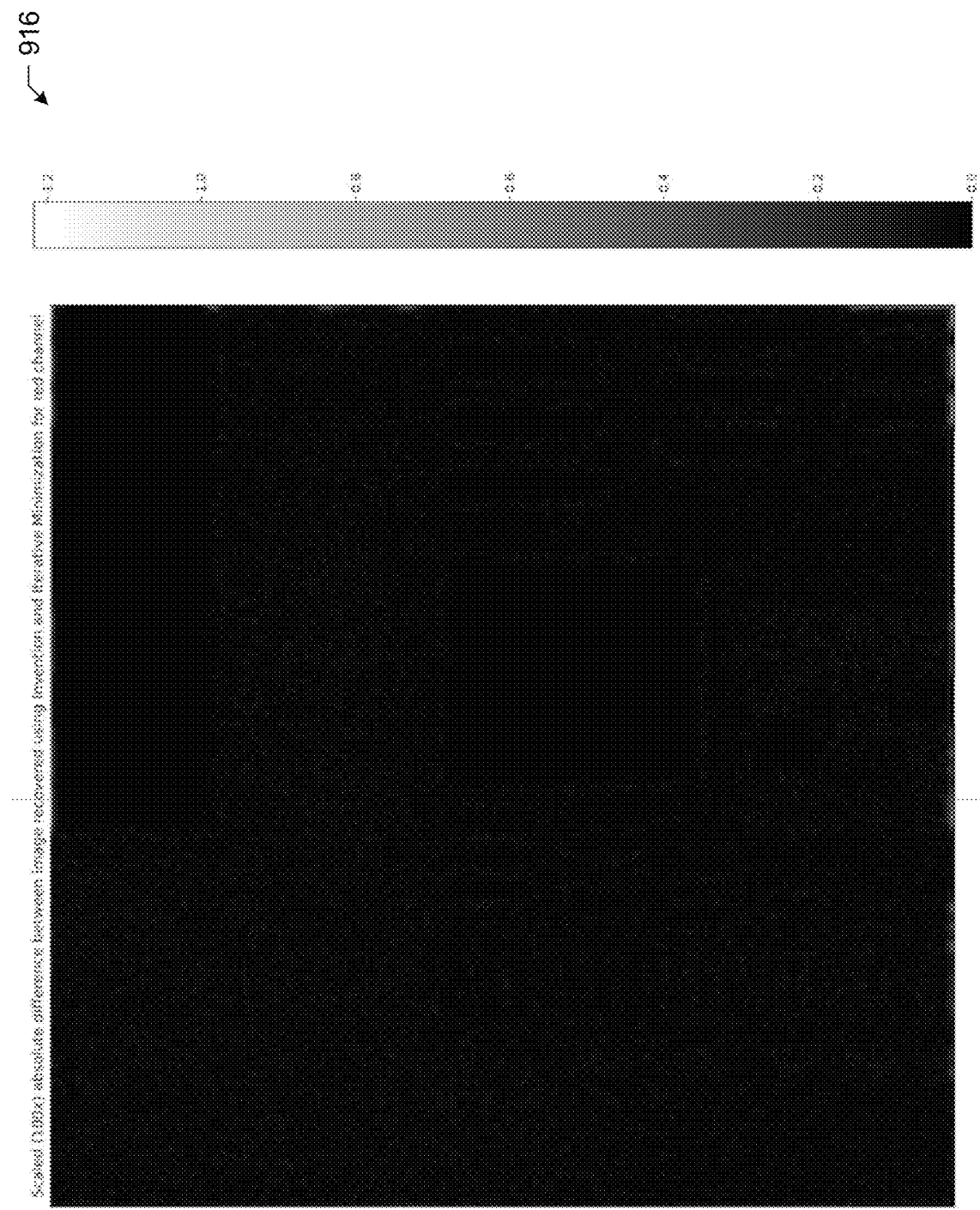

FIG. 9F illustrates an example representation, in higher resolution, of an example image 914 showing the difference between the blurred image and the ground truth image. FIG. 9G illustrates an example representation, in higher resolution, of an example image 916 showing the difference between the blurred image and the deblurred image produced based on iterative minimization. FIG. 9H illustrates an example representation, in higher resolution, of an example image 918 showing the difference between the blurred image and the deblurred image produced based on a self-regularizing inverse filter of the disclosed technology. FIG. 9I illustrates an example representation, in higher resolution, of an example image 920 showing a scaled (100×) absolute difference in the red channel between the deblurred image produced based on iterative minimization and the deblurred image produced based on a self-regularizing inverse filter of the disclosed technology.

Figure 9J:
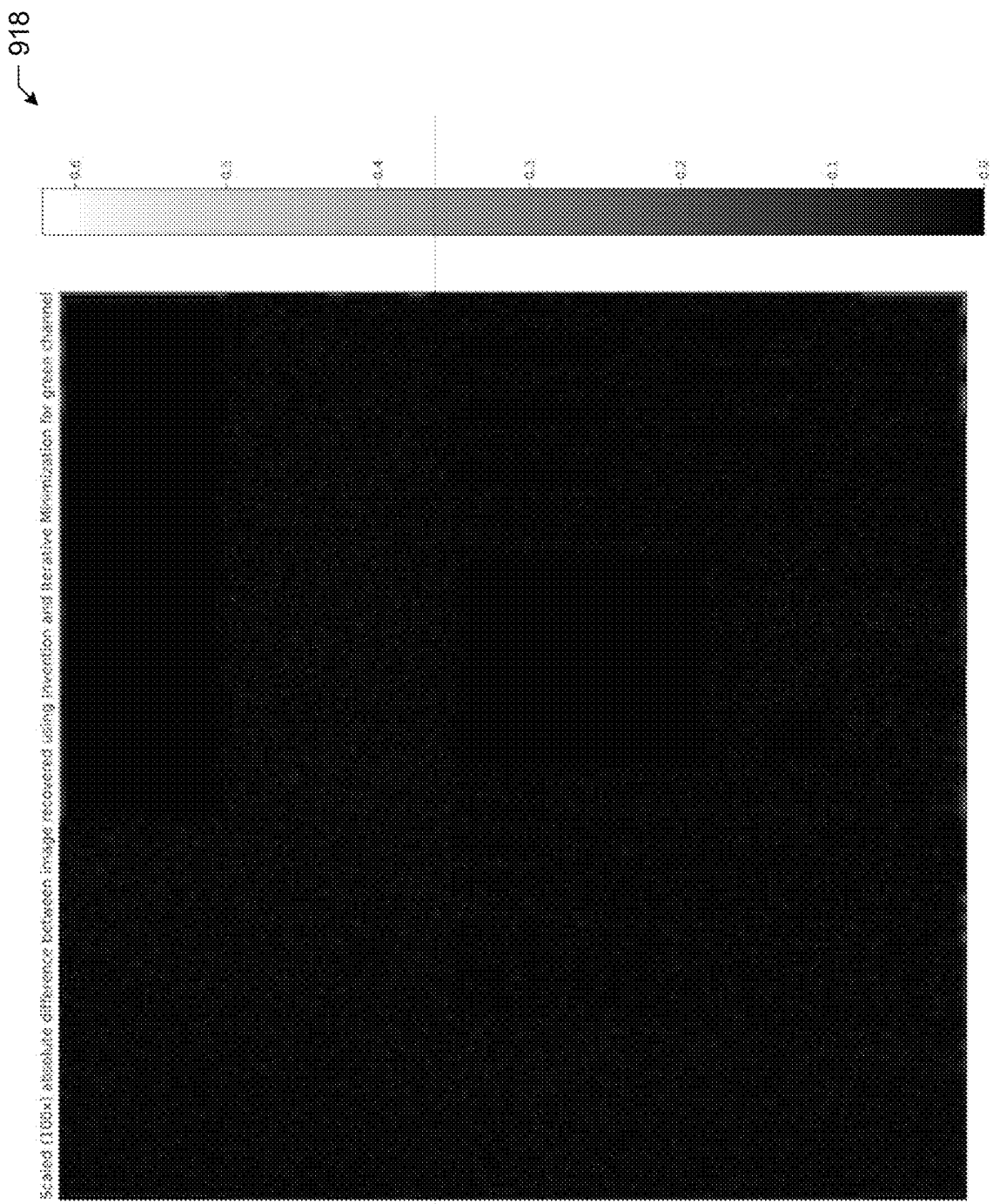
Figure 9K:
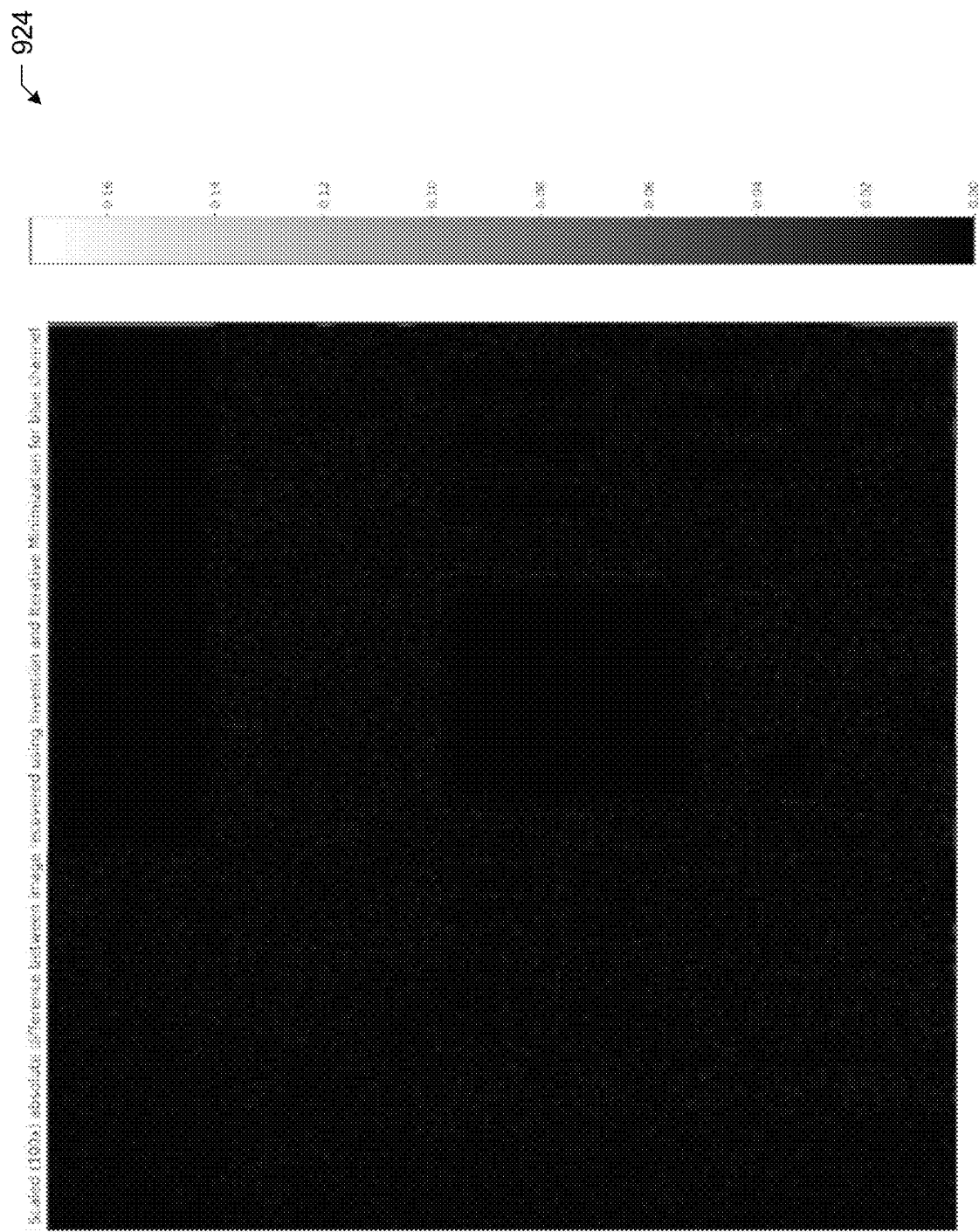

FIG. 9J illustrates an example representation, in higher resolution, of an example image 922 showing a scaled (100×) absolute difference in the green channel between the deblurred image produced based on iterative minimization and the deblurred image produced based on a self-regularizing inverse filter of the disclosed technology. FIG. 9K illustrates an example representation, in higher resolution, of an example image 924 showing a scaled (100×) absolute difference in the blue channel between the deblurred image produced based on iterative minimization and the deblurred image produced based on a self-regularizing inverse filter of the disclosed technology. It should be understood that other example images herein can be represented by their respective higher (or full) resolution images.

Figure 10:
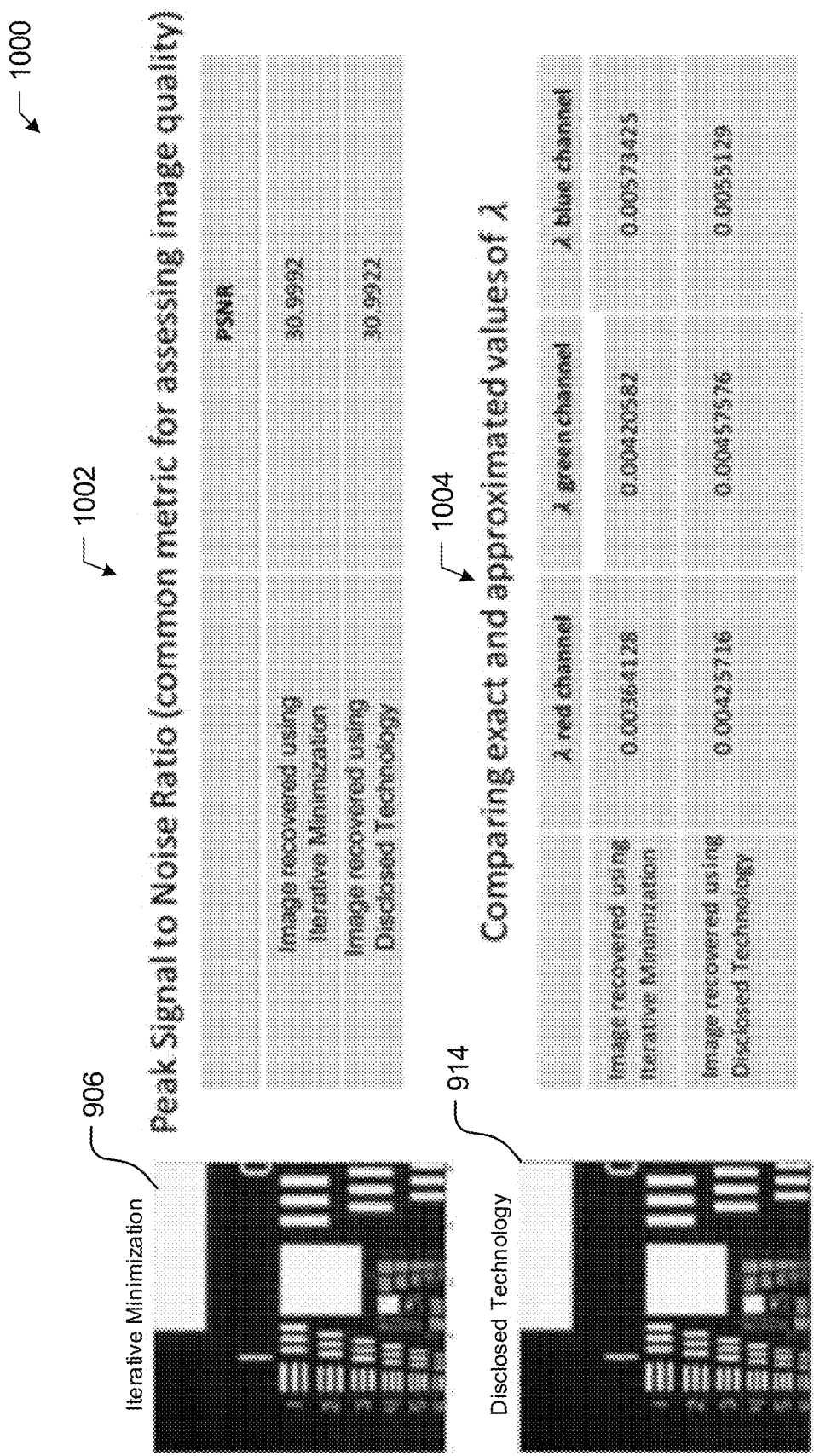

FIG. 10 and FIG. 11 illustrate additional experimental examples associated with generating a deblurred image using a conventional regularized inverse filter and a deblurred image based on a self-regularizing inverse filter of the disclosed technology to remove one or more blurring artifacts in real-time or near real-time. For example, FIG. 10 illustrates an example diagram 1000, which includes a peak signal to noise ratio (PSNR) table 1002 and another table 1004 for the optimized regularization parameter $\lambda^*$ as compared to the estimated regularization parameter $\tilde{\lambda}$ of the disclosed technology. As depicted by the table 1002, the PSNR corresponding to the optimized regularization parameter $\lambda^*$ may include a value of 30.9992 and the PSNR corresponding to the estimated regularization parameter $\tilde{\lambda}$ may include a value of 30.9922 (e.g., computed in real-time or near real-time as compared to the time-consuming and computationally expensive optimized regularization parameter $\lambda^*$). Similarly, the table 1004 depicts the optimized regularization parameter $\lambda^*$ values for each of a red color component, green color component, and blue color component for an image and the corresponding estimated regularization parameter $\tilde{\lambda}$ values for each of the red color component, green color component, and blue color component.

In another example, FIG. 11 shows a non-limiting example of a table 1102 of experimental examples for a 512×512 resolution image and unnormalized raw data image utilizing the presently disclosed techniques. As depicted, the presently disclosed techniques (e.g., as described above with respect to method 400B of FIG. 4B) may improve computational speeds by up to, for example, 5 times per color component (e.g., as compared to method 400A of FIG. 4A) and 3.4 times per color component, respectively.

Figure 12:
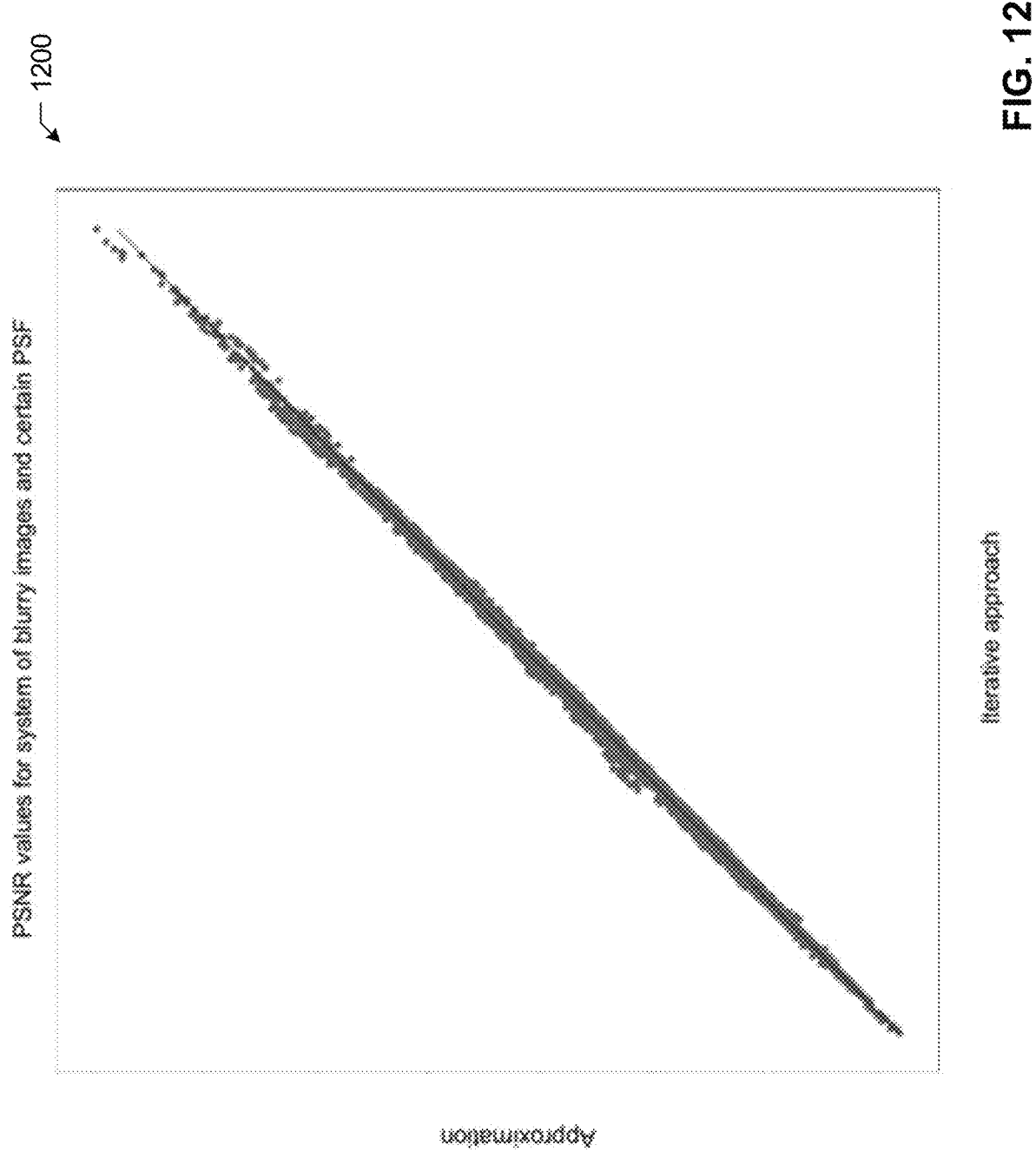
FIG. 12 illustrates a plot for an example empirical validation associated with the disclosed technology.

FIG. 12 illustrates a plot for an example empirical validation associated with the disclosed technology. As an example, to check the validity of the approximation associated with disclosed technology, an empirical evaluation of a large quantity of images (e.g., 10,000 images) with different types of PSFs and noise settings can be run. The findings are consistent throughout all the example experiments; the results of one example are shown in plot FIG. 12. The example plot illustrates the PSNR between the quality of the image recovered using the approximation associated with the disclosed technology and the quality of the image recovered using a conventional approach. An ideal plot in this example would be a line 'y=x' indicating identical results produced by the disclosed technology and the conventional iterative approach. As can be seen from this plot, the disclosed technology performs well as it reveals strong agreement between the results produced by disclosed technology and the results produced by the conventional iterative approach.

Figure 13:
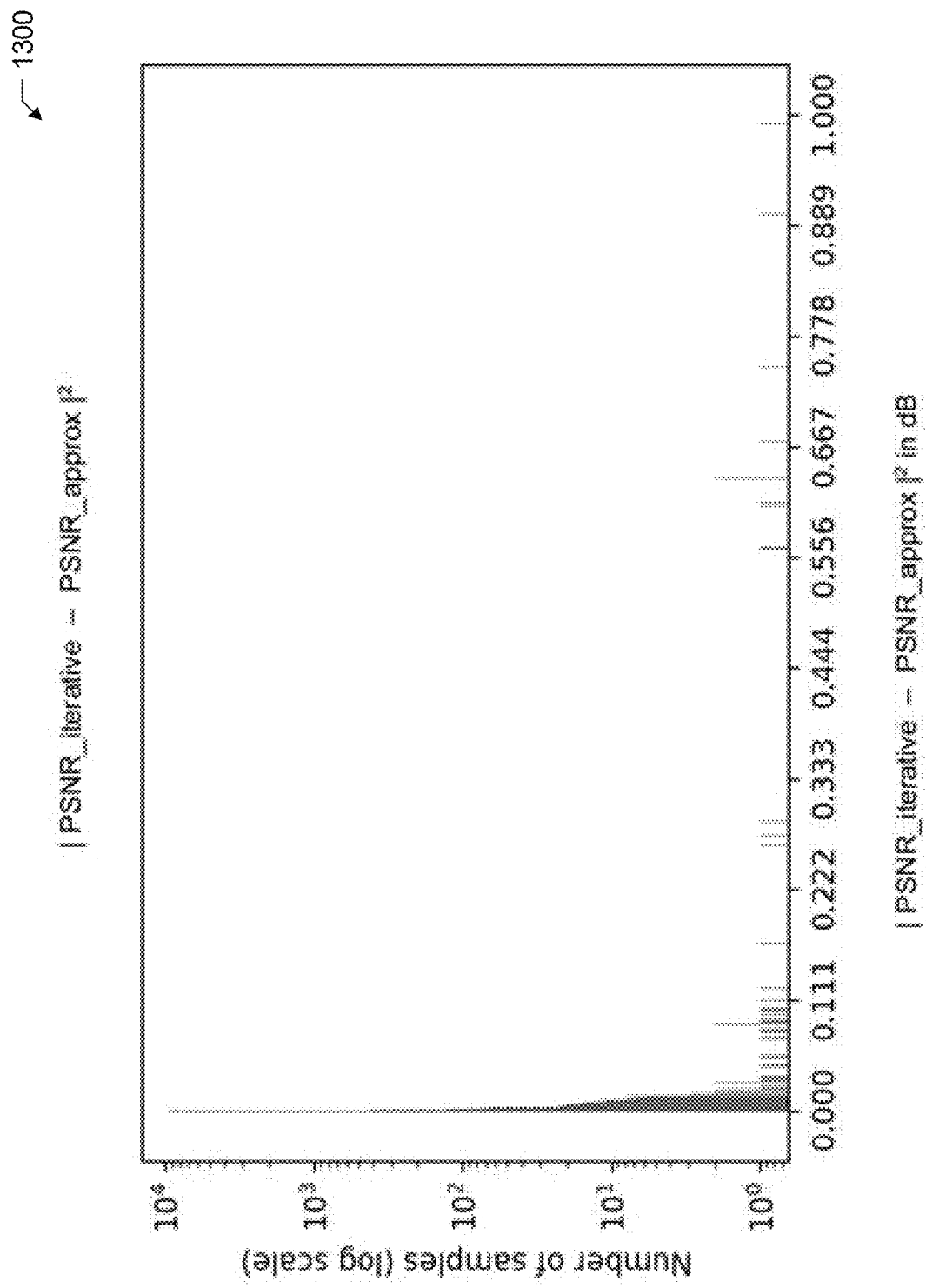
FIG. 13 illustrates an example histogram of a squared absolute difference between the PSNR of the iterative approach and the PSNR of the disclosed technology.

While the example plot in FIG. 12 shows that the PSNR values of images reconstructed using the iterative method and using the disclosed technology are in agreement, FIG. 13 illustrates an example histogram of a squared absolute difference between the PSNR of the iterative approach and the PSNR of the disclosed technology. In the example of FIG. 13, PSNR_iterative is the PSNR value obtained by comparing the reconstructed image using the iterative optimization approach with respect to the ground truth, and PNSR_approx is the PSNR value obtained by comparing the reconstructed image using the self-regularizing inverse filter of the disclosed technology with respect to the ground truth.

Figure 14:
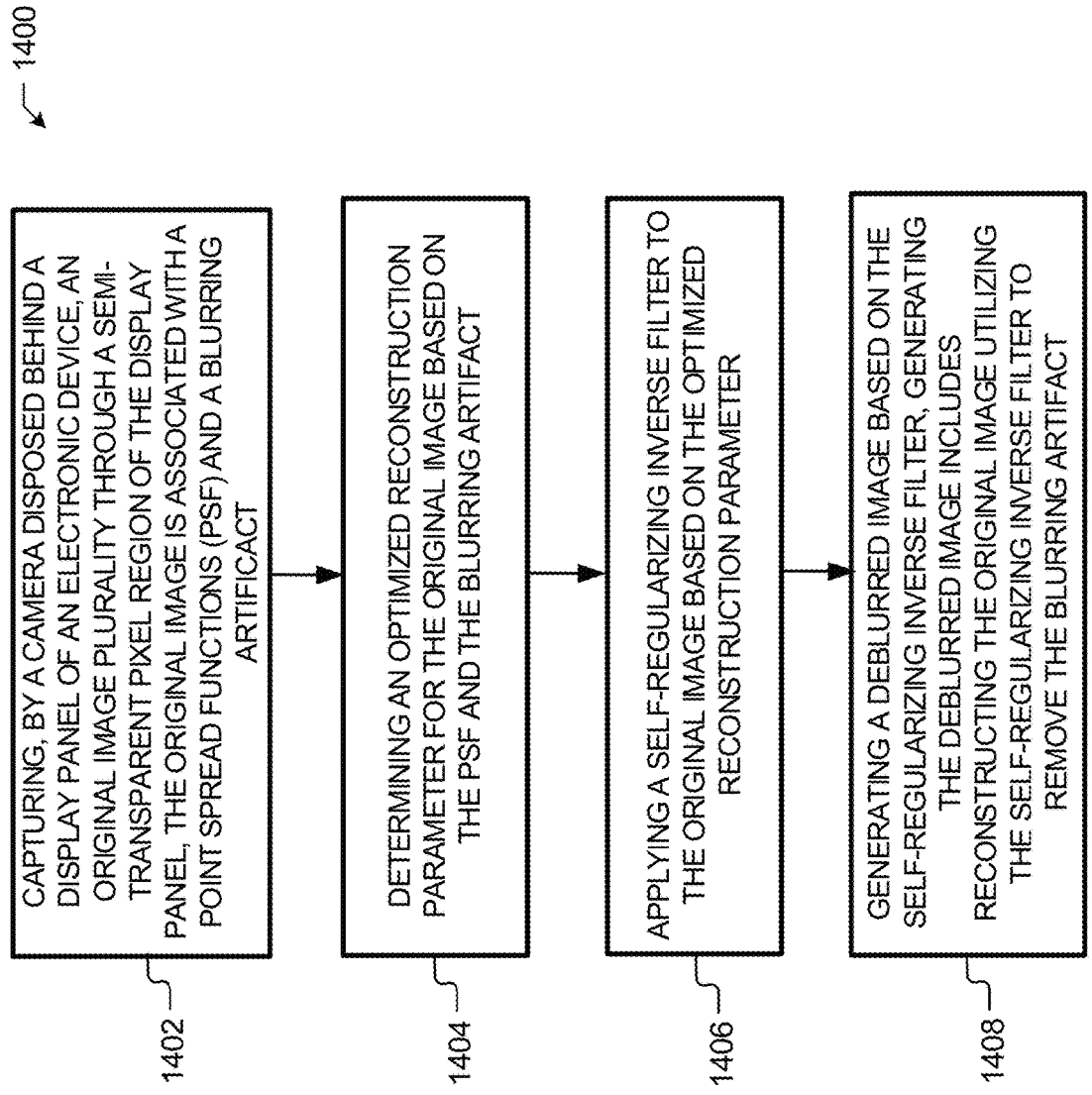
FIG. 14 illustrates a flow diagram of a method for generating a deblurred image based on a self-regularizing inverse filter to remove one or more blurring artifacts in real-time or near real-time.

FIG. 14 illustrates a flow diagram of a method 1400 for generating a deblurred image based on a self-regularizing inverse filter to remove one or more blurring artifacts, in accordance with the presently disclosed embodiments. The method 1400 may be performed utilizing one or more processing devices (e.g., the one or more processors 104) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 1400 may begin at block 1402 with the one or more processing devices (e.g., one or more processors 104 of the electronic device 102) capturing, by a camera disposed behind a display panel of the electronic device, an original image through a semi-transparent pixel region of the display panel, in which the original image is associated with one or more predetermined point spread functions (PSFs) and includes one or more blurring artifacts. The method 1400 may then continue at block 1404 with the one or more processing devices (e.g., one or more processors 104 of the electronic device 102) determining an estimated regularization parameter for the original image based on the one or more predetermined PSFs and the one or more blurring artifacts. The method 1400 may then continue at block 1406 with the one or more processing devices (e.g., one or more processors 104 of the electronic device 102) applying a self-regularizing inverse filter to the original image based on the estimated regularization parameter. The method 1400 may then conclude at block 1408 with the one or more processing devices (e.g., one or more processors 104 of the electronic device 102) generating a deblurred image based on the self-regularizing inverse filter, in which generating the deblurred image comprises reconstructing the original image utilizing the self-regularizing inverse filter to remove the one or more blurring artifacts.

In accordance with presently disclosed embodiments, a deblurred image based on a self-regularizing inverse filter may be generated to remove one or more blurring artifacts in real-time or near real-time. In this way, the present embodiments may increase the viewing area and the resolution of the display panel 112 of the electronic device 102 by disposing one or more front-facing cameras 110 of the electronic device 102 behind the display panel 112. For example, because of the increase in display area (e.g., having eliminated the display area typically designated for the one or more front-facing cameras 110), the electronic device 102 may further provide for improved (GUIs) with a full screen view in its entirety, as opposed to limited to only displaying battery status, cellular signal strength data, Wi-Fi status, time info, and so forth, in line with a notch design or hole-punch design. The present techniques may further increase an aesthetic quality of the electronic device 102, as well as allow a user of the electronic device 102 to display higher resolution images on the display panel 112 of the electronic device 102. Still further, because the one or more front-facing cameras 110 may be placed behind the display panel 112, the present techniques may allow the one or more front-facing cameras 110 to be placed anywhere, such as in a center area of the display panel 112 (e.g., as opposed to in a corner or along an edge of the display panel 112) of the electronic device 102. This may provide an improved user experience and/or GUI, such as by directing a user taking a selfie to gaze at the center area of the display panel 112, and further by giving the impression of eye-to-eye contact with another user when the user is participating in a videoconference, a videotelephonic exchange, or other video-streaming service.

Figure 15:
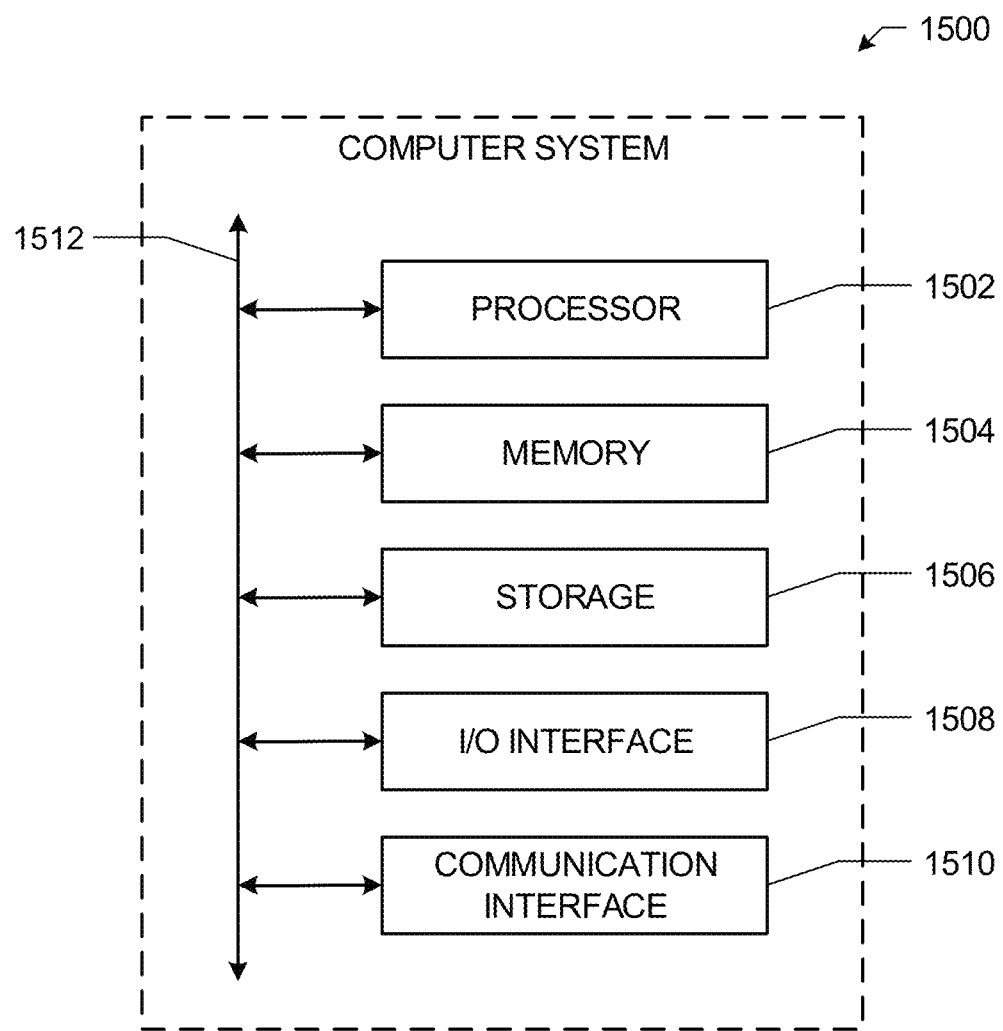
FIG. 15 illustrates an example computer system.

FIG. 15 illustrates an example computer system 1500 that may be utilized for generating a deblurred image based on a self-regularizing inverse filter to remove one or more blurring artifacts in real-time or near real-time, in accordance with the presently disclosed embodiments. In particular embodiments, one or more computer systems 1500 perform one or more steps of one or more methods described or illustrated herein. In particular embodiments, one or more computer systems 1500 provide functionality described or illustrated herein. In particular embodiments, software running on one or more computer systems 1500 performs one or more steps of one or more methods described or illustrated herein or provides functionality described or illustrated herein. Particular embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks.

Where appropriate, one or more computer systems 1500 may perform without substantial spatial or temporal limitation one or more steps of one or more methods described or illustrated herein. As an example, and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In particular embodiments, computer system 1500 includes a processor 1502, memory 1504, storage 1506, an input/output (I/O) interface 1508, a communication interface

1510, and a bus 1512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1502 includes hardware for executing instructions, such as those making up a computer program. As an example, and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example, and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502.

Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In particular embodiments, memory 1504 includes main memory for storing instructions for processor 1502 to execute or data for processor 1502 to operate on. As an example, and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere).

One or more memory buses (which may each include an address bus and a data bus) may couple processor 1502 to memory 1504. Bus 1512 may include one or more memory buses, as described below. In particular embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In particular embodiments, storage 1506 includes mass storage for data or instructions. As an example, and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In particular embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In particular embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1506 for them. Where appropriate, I/O interface 1508 may include one or more device or software drivers enabling processor 1502 to drive one or more of these I/O devices. I/O interface 1508 may include one or more I/O interfaces 1506, where appropriate. Although this disclosure describes and illustrates a particular I/O interface, this disclosure contemplates any suitable I/O interface.

In particular embodiments, communication interface 1510 includes hardware, software, or both providing one or more interfaces for communication (such as, for example, packet-based communication) between computer system 1500 and one or more other computer systems 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it.

As an example, and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example, and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the disclosed technology are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:
capturing, by a camera disposed behind a display panel of the electronic device, an original image through a semi-transparent pixel region of the display panel, wherein the original image is associated with one or more predetermined point spread functions (PSFs) and includes one or more blurring artifacts;
determining an estimated regularization parameter that reduces a complexity of a deblurring filter for deblurring the original image based on the one or more predetermined PSFs and the one or more blurring artifacts;

applying a self-regularizing inverse filter as the deblurring filter to the original image based on the estimated regularization parameter that reduces the complexity of the deblurring filter; and generating a deblurred image based on the self-regularizing inverse filter, wherein generating the deblurred image comprises reconstructing the original image utilizing the self-regularizing inverse filter to remove the one or more blurring artifacts.

2. The method of claim 1, wherein the estimated regularization parameter is determined based on a bounded function.

3. The method of claim 1, wherein determining the estimated regularization parameter comprises:

converting a first function representing the original image from a spatial domain to a frequency domain to generate a first frequency domain representation of the original image;

converting a second function representing the one or more predetermined PSFs from the spatial domain to the frequency domain to generate a second frequency domain representation of the one or more predetermined PSFs; and determining the estimated regularization parameter based on the first frequency domain representation and the second frequency domain representation.

4. The method of claim 3, wherein applying the self-regularizing inverse filter to the original image comprises:

generating an inverse kernel matrix based on the estimated regularization parameter, wherein the inverse kernel matrix is generated utilizing the self-regularizing inverse filter; and generating a frequency domain representation of the deblurred image, wherein the frequency domain representation of the deblurred image is generated based on the inverse kernel matrix and the first frequency domain representation of the original image.

5. The method of claim 4, wherein generating the deblurred image comprises:

converting the frequency domain representation of the deblurred image from the frequency domain to the spatial domain to generate the deblurred image.

6. The method of claim 1, wherein the deblurred image is generated in real-time or near real-time with respect to capturing the original image.

7. The method of claim 1, wherein the one or more predetermined PSFs are premeasured based on a calibration process performed with respect to the camera and the display panel prior to capturing the original image.

8. An electronic device comprising:

a display panel;

a camera disposed behind the display panel;

one or more non-transitory computer-readable storage media including instructions; and one or more processors coupled to the storage media and the camera, the one or more processors configured to execute the instructions to:

capture, by the camera, an original image through a semi-transparent pixel region of the display panel, wherein the original image is associated with one or more predetermined point spread functions (PSFs) and includes one or more blurring artifacts;

estimate an optimal regularization parameter that reduces a complexity of a deblurring filter for deblurring the original image based on the one or more predetermined PSFs and the one or more blurring artifacts;

apply a self-regularizing inverse filter as the deblurring filter to the original image based on the estimated regularization parameter that reduces the complexity of the deblurring filter; and generate a deblurred image based on the self-regularizing inverse filter.

9. The electronic device of claim 8, wherein the estimated regularization parameter is determined based on a bounded function.

10. The electronic device of claim 8, wherein the instructions to estimate the optimal regularization parameter further comprise instructions to:

convert a first function representing the original image from a spatial domain to a frequency domain to generate a first frequency domain representation of the original image;

convert a second function representing the one or more predetermined PSFs from the spatial domain to the frequency domain to generate a second frequency domain representation of the one or more predetermined PSFs; and estimate the optimal regularization parameter based on the first frequency domain representation and the second frequency domain representation.

11. The electronic device of claim 10, wherein the instructions to apply the self-regularizing inverse filter to the original image further comprise instructions to:

generate an inverse kernel matrix based on the estimated regularization parameter, wherein the inverse kernel matrix is generated utilizing the self-regularizing inverse filter; and generate a frequency domain representation of the deblurred image, wherein the frequency domain representation of the deblurred image is generated based on the inverse kernel matrix and the first frequency domain representation of the original image.

12. The electronic device of claim 11, wherein the instructions to generate the deblurred image further comprise instructions to:

convert the frequency domain representation of the deblurred image from the frequency domain to the spatial domain to generate the deblurred image.

13. The electronic device of claim 8, wherein the deblurred image is generated in real-time or near real-time with respect to capturing the original image.

14. The electronic device of claim 8, wherein the one or more predetermined PSFs are premeasured based on a calibration process performed with respect to the camera and the display panel prior to capturing the original image.

15. A non-transitory computer-readable medium comprising instructions that, when executed by one or more processors of an electronic device, cause the one or more processors to:

capture, by a camera disposed behind a display panel of the electronic device, an original image through a semi-transparent pixel region of the display panel, wherein the original image is associated with one or more predetermined point spread functions (PSFs) and includes one or more blurring artifacts;

estimate an optimal regularization parameter that reduces a complexity of a deblurring filter for deblurring the original image based on the one or more predetermined PSFs and the one or more blurring artifacts;

apply a self-regularizing inverse filter as the deblurring filter to the original image based on the estimated regularization parameter that reduces the complexity of the deblurring filter; and generate a deblurred image based on the self-regularizing inverse filter.

16. The non-transitory computer-readable medium of claim 15, wherein the estimated regularization parameter is determined based on a bounded function.

17. The non-transitory computer-readable medium of claim 15, wherein the instructions to estimate the optimal regularization parameter further comprise instructions to:

convert a first function representing the original image from a spatial domain to a frequency domain to generate a first frequency domain representation of the original image;

convert a second function representing the one or more predetermined PSFs from the spatial domain to the frequency domain to generate a second frequency domain representation of the one or more predetermined PSFs; and estimate the optimal regularization parameter based on the first frequency domain representation and the second frequency domain representation.

18. The non-transitory computer-readable medium of claim 17, wherein the instructions to apply the self-regularizing inverse filter to the original image further comprise instructions to:

generate an inverse kernel matrix based on the estimated regularization parameter, wherein the inverse kernel matrix is generated utilizing the self-regularizing inverse filter; and generate a frequency domain representation of the deblurred image, wherein the frequency domain representation of the deblurred image is generated based on the inverse kernel matrix and the first frequency domain representation of the original image.

19. The non-transitory computer-readable medium of claim 18, wherein the instructions to generate the deblurred image further comprise instructions to:

convert the frequency domain representation of the deblurred image from the frequency domain to the spatial domain to generate the deblurred image.

20. The non-transitory computer-readable medium of claim 15, wherein the deblurred image is generated in real-time or near real-time with respect to capturing the original image.

* * * * *